(12) United States Patent
Lin et al.

(10) Patent No.: US 12,427,411 B2
(45) Date of Patent: Sep. 30, 2025

(54) METHOD OF DISPLAYING SHOOTING FOR VIRTUAL FIREARM, APPARATUS, AND COMPUTER-READABLE STORAGE MEDIUM

(71) Applicant: Tencent Technology (Shenzhen) Company Limited, Guangdong (CN)

(72) Inventors: Lingyun Lin, Shenzhen (CN); Jinhao Yang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 351 days.

(21) Appl. No.: 18/137,029

(22) Filed: Apr. 20, 2023

(65) Prior Publication Data

US 2023/0271084 A1    Aug. 31, 2023

Related U.S. Application Data

(63) Continuation of application No. PCT/CN2022/092416, filed on May 12, 2022.

(30) Foreign Application Priority Data

Jun. 18, 2021    (CN) .......................... 202110679160.3

(51) Int. Cl.
*A63F 13/52*    (2014.01)
*A63F 13/55*    (2014.01)
*A63F 13/837*    (2014.01)

(52) U.S. Cl.
CPC .............. *A63F 13/52* (2014.09); *A63F 13/55* (2014.09); *A63F 13/837* (2014.09); *A63F 2300/8076* (2013.01)

(58) Field of Classification Search
CPC ........ A63F 13/52; A63F 13/55; A63F 13/837; A63F 13/57; A63F 2300/8076
(Continued)

(56) References Cited

U.S. PATENT DOCUMENTS 10,712,116 B1 *    7/2020    Baxter ................... F41A 33/00
11,410,592 B1 *    8/2022    Chiang ................ G09G 3/2003
(Continued)

FOREIGN PATENT DOCUMENTS

CN    108815851 A    11/2018
CN    110841292 A    2/2020
(Continued)

OTHER PUBLICATIONS

Jokoon, "How would you simulate gun recoil in a FPS", gamedev. net/forums/topic/621878-how-would-you-simulate-gun-recoil-in-a-fps/4923201/, Mar. 15, 2012 (Year: 2012).*
(Continued)

*Primary Examiner* — Michael A Cuff
(74) *Attorney, Agent, or Firm* — Crowell & Moring LLP

(57) ABSTRACT

This application discloses a shooting display method and apparatus for a virtual firearm, a computer device and a storage medium, and relates to the technical field of virtual scenes. The method includes: displaying a virtual firearm in a virtual scene; controlling the virtual firearm for continuous shooting in a virtual scene; and displaying, in response to the virtual firearm performing one shot during the continuous shooting, at least one of a body recoil animation and a muzzle recoil animation of the virtual firearm, where the body recoil animation is an animation in which a body of the virtual firearm fluctuates according to a fluctuation curve in at least one direction of an X axis and a Y axis.

20 Claims, 15 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2018/0050268 A1 | 2/2018 | Jones | |
| 2021/0394045 A1* | 12/2021 | Park | A63F 13/213 |
| 2024/0019224 A1* | 1/2024 | O'Dell | F41A 19/01 |

FOREIGN PATENT DOCUMENTS

| | | | | |
|---|---|---|---|---|
| CN | 111589148 A | | 8/2020 | |
| CN | 111870963 A | * | 11/2020 | ............. A63F 13/86 |
| CN | 112121416 A | | 12/2020 | |
| CN | 112121424 A | | 12/2020 | |
| CN | 112169325 A | | 1/2021 | |
| CN | 112755526 A | | 5/2021 | |
| CN | 113230654 A | | 8/2021 | |
| WO | WO 2022/166483 A1 | | 8/2022 | |
| WO | WO 2022/262489 A1 | | 12/2022 | |

OTHER PUBLICATIONS

International Search Report and Written Opinion for priority application No. PCT/CN2022/092416 dated Aug. 11, 2022, 7p.
English language translation of the International Search Report for priority application No. PCT/CN2022/092416 dated Aug. 11, 2022, 3p.
First Office Action and Search Report for corresponding Chinese application No. 202110679160.3 dated Oct. 19, 2022, 9p, in Chinese language.
Concise Explanation of Relevance for A13 and the Written Opinion of A11.
Office Action issued in Japanese Patent Application No. 2023-558858 dated Feb. 10, 2025, w/English translation, 10 pages.
"Advanced Recoil System Using Unreal Engine 5 & C++ (Part Four)": https://www.youtube.com/watch?v=UWrbMkX4xhU, 2021.
"The animation and the firing effect of contribution after a long time and for the time being counteraction where attached," https://www.tiktok.com/@santa01254/video/6676699003213630722, 2019.
"A difference in the reaction of a gun" https://www.nicovideo.jp/watch/sm37I375I8, 2020.
Iijima Kishi, "Considerations for production of animation" Human Body, Nov. 2005, w/English translation, 28 pages.
Office Action issued in Japanese Patent Application No. 2023-558858 dated Aug. 26, 2024, 10 pages.
Game Development, "Advanced Recoil System Using Unreal Engine 5 & C++ (Part Four)" Youtube [online] [video], Jun. 15, 2021, https://www.youtube.com/watch?v=UWrbMkX4xhU, [retrieved Aug. 26, 2024].

* cited by examiner

Determine, based on a shot count corresponding to a current shot in the continuous shooting, a base displacement amount of the virtual firearm and a recoil factor of the virtual firearm, where the recoil factor is positively correlated with a shot count — 6621

Determine a first sinusoid based on a base Displacement of the virtual firearm and a recoil factor of the virtual firearm — 6622

Determine, during a current shot, a movement direction of the virtual firearm along the X axis — 6623

Change a sign of the first sinusoid in a case that the movement direction of the virtual firearm along the X axis is inconsistent with a fluctuation direction of the first sinusoid — 6624

Display a body recoil animation in which the body of the virtual firearm fluctuates according to the first sinusoid in the X axis direction — 6625

FIG. 7

METHOD OF DISPLAYING SHOOTING FOR VIRTUAL FIREARM, APPARATUS, AND COMPUTER-READABLE STORAGE MEDIUM

RELATED APPLICATION

This application is a continuation of International Patent Application No. PCT/CN2022/092416, filed on May 12, 2022, which claims priority to Chinese patent application No. 202110679160.3 filed on Jun. 18, 2021, entitled "SHOOTING DISPLAY METHOD AND APPARATUS FOR VIRTUAL FIREARM, COMPUTER DEVICE AND STORAGE MEDIUM." The entire contents of the above applications are incorporated herein by reference.

TECHNICAL FIELD

This disclosure relates to the technical field of virtual scenes, and particularly relates to a shooting display method and apparatus for a virtual firearm, a computer device and a storage medium.

BACKGROUND

A hitting feeling refers to a feeling of shooting with a real gun for a user through feedback of an animation, a sound effect, a special effect and other dimensions in a virtual scene. For example, in a shooter game, a feeling of real shooting is fed back to the user who performs shooting by means of a gun sound, a vibration animation of the gun, a special effect of hitting a target object after shooting, etc.

In the related art, a recoil generated during shooting of a virtual firearm is simulated by back and forth displacement of the virtual firearm, so as to provide the user with the hitting feeling during shooting.

However, the simple back and forth displacement of the virtual firearm appears monotonous in representing the recoil of the virtual firearm. It is a problem to be solved how to better show the hitting feeling of the virtual firearm during shooting in the virtual scene.

SUMMARY

The embodiments of this disclosure provide a shooting display method and apparatus for a virtual firearm, a computer device and a storage medium, which can better show a hitting feeling of the virtual firearm during shooting. The technical solutions are as follows.

According to one aspect of this disclosure, there is provided a display method for a virtual firearm's shooting, applied to a computer device. The method includes:
  displaying a virtual firearm in a virtual scene;
  controlling the virtual firearm for continuous shooting in the virtual scene; and
  displaying, in response to the virtual firearm performing one shot during the continuous shooting, at least one of a body recoil animation and a muzzle recoil animation of the virtual firearm, the body recoil animation being an animation in which a body of the virtual firearm fluctuates according to a fluctuation curve in at least one direction of an X axis and a Y axis,
  the muzzle recoil animation being an animation in which a muzzle of the virtual firearm fluctuates according to a fluctuation curve with a root node of the virtual firearm as a center,
  the X axis being a horizontal recoil direction of the virtual firearm, and
  the Y axis being a vertical recoil direction of the virtual firearm.

According to another aspect of this application, there is provided a shooting display apparatus for a virtual firearm, including:
  a display module configured to display the virtual firearm in a virtual scene; and
  a control module configured to control the virtual firearm for continuous shooting in the virtual scene;
  the display module is further configured to display, in response to the virtual firearm performing one shot during the continuous shooting, at least one of a body recoil animation and a muzzle recoil animation of the virtual firearm,
  where the body recoil animation is an animation in which a body of the virtual firearm fluctuates according to a fluctuation curve in at least one direction of an X axis and a Y axis; the muzzle recoil animation is an animation in which a muzzle of the virtual firearm fluctuates according to a fluctuation curve with a root node of the virtual firearm as a center; the X axis is used for indicating a horizontal recoil direction of the virtual firearm; and the Y axis is used for indicating a vertical recoil direction of the virtual firearm.

According to another aspect of this disclosure, there is provided a computer device including a processor and a memory having stored therein at least one instruction loaded and executed by the processor to implement the shooting display method for the virtual firearm as provided in various aspects of this disclosure.

According to another aspect of this disclosure, there is provided a non-transitory computer-readable storage medium having stored therein computer instructions that are loaded and executed by the processor to implement the shooting display method for the virtual firearm as provided in various aspects of this disclosure.

According to another aspect of this disclosure, there is provided a non-transitory computer-readable storage medium having stored therein computer instructions that are loaded and executed by the processor to implement steps including:
  displaying a virtual firearm in a virtual scene;
  controlling the virtual firearm for continuous shooting in the virtual scene; and
  displaying, in response to the virtual firearm performing one shot during the continuous shooting, at least one of a body recoil animation and a muzzle recoil animation of the virtual firearm, the body recoil animation being an animation in which a body of the virtual firearm fluctuates according to a fluctuation curve in at least one direction of an X axis and a Y axis,
  the muzzle recoil animation being an animation in which a muzzle of the virtual firearm fluctuates according to a fluctuation curve with a root node of the virtual firearm as a center,
  the X axis being a horizontal recoil direction of the virtual firearm, and
  the Y axis being a vertical recoil direction of the virtual firearm.

According to one aspect of this disclosure, there is provided a computer program product that includes computer instructions stored in the computer-readable storage medium. The processor of the computer device reads the computer instructions from the computer-readable storage medium, and executes the computer instructions to cause the computer device to perform the above-described shooting display method for the virtual firearm.

Some embodiments of this disclosure have at least the following beneficial effects.

When the virtual firearm is displayed in the virtual scene and the virtual firearm is controlled to perform continuous shooting, by displaying at least one of the body recoil animation and the muzzle recoil animation of the virtual firearm, an animation performance of continuous shooting of the virtual firearm is closer to a recoil performance of real shooting, so as to improve the hitting feeling of the user performing simulated shooting with the virtual firearm.

BRIEF DESCRIPTION OF THE DRAWINGS

FIG. 7 is a flowchart of a method of displaying a body recoil animation in which a body of a virtual firearm fluctuates according to a first sinusoid in an X axis direction provided by an exemplary embodiment of this disclosure;

DESCRIPTION OF EMBODIMENTS

In order that the embodiments of this disclosure may be readily understood, description will now be made to the terms which occur in the embodiments of this disclosure.

Virtual Scene: it refers to a virtual world that an application displays (or provides) when running on a terminal.

Illustratively, the virtual world may be a simulated world of the real world, a semi-simulated semi-fictitious three-dimensional world, or a purely fictitious three-dimensional world.

Illustratively, the virtual world may be any one of a two-dimensional virtual world, a 2.5-dimensional virtual world, and a three-dimensional virtual world.

Exemplarily, the virtual world is further used for a virtual world battle between at least two virtual roles, and virtual resources available to the at least two virtual roles are provided in the virtual world.

A virtual role: it refers to a movable object in the virtual world. The movable object may be at least one of a virtual human, a virtual animal, and an animated human character. Exemplarily, when the virtual world is a three-dimensional virtual world, the virtual roles may be three-dimensional stereoscopic models, each having its own shape and volume in the three-dimensional virtual world, and occupying a part of a space in the three-dimensional virtual world. Exemplarily, each virtual role is a three-dimensional character constructed according to a three-dimensional human skeleton technology. Each virtual role wears different skins to implement different appearances. In some implementations, each virtual role may also be implemented using 2.5-dimensional or 2-dimensional models, which is not limited by the embodiments of this disclosure.

A display method for a virtual firearm's shooting in the related art shows a recoil of the virtual firearm by displaying an animation in which the virtual firearm moves back and forth during continuous shooting of the virtual firearm. However, in this way, the recoil of the virtual firearm is very monotonous, and a user cannot obtain the experience of real shooting. The method provided by this application makes the continuous shooting process of the virtual firearm more realistic by displaying at least one of a muzzle recoil animation and a body recoil animation of the virtual firearm during continuous shooting.

Figure 1:
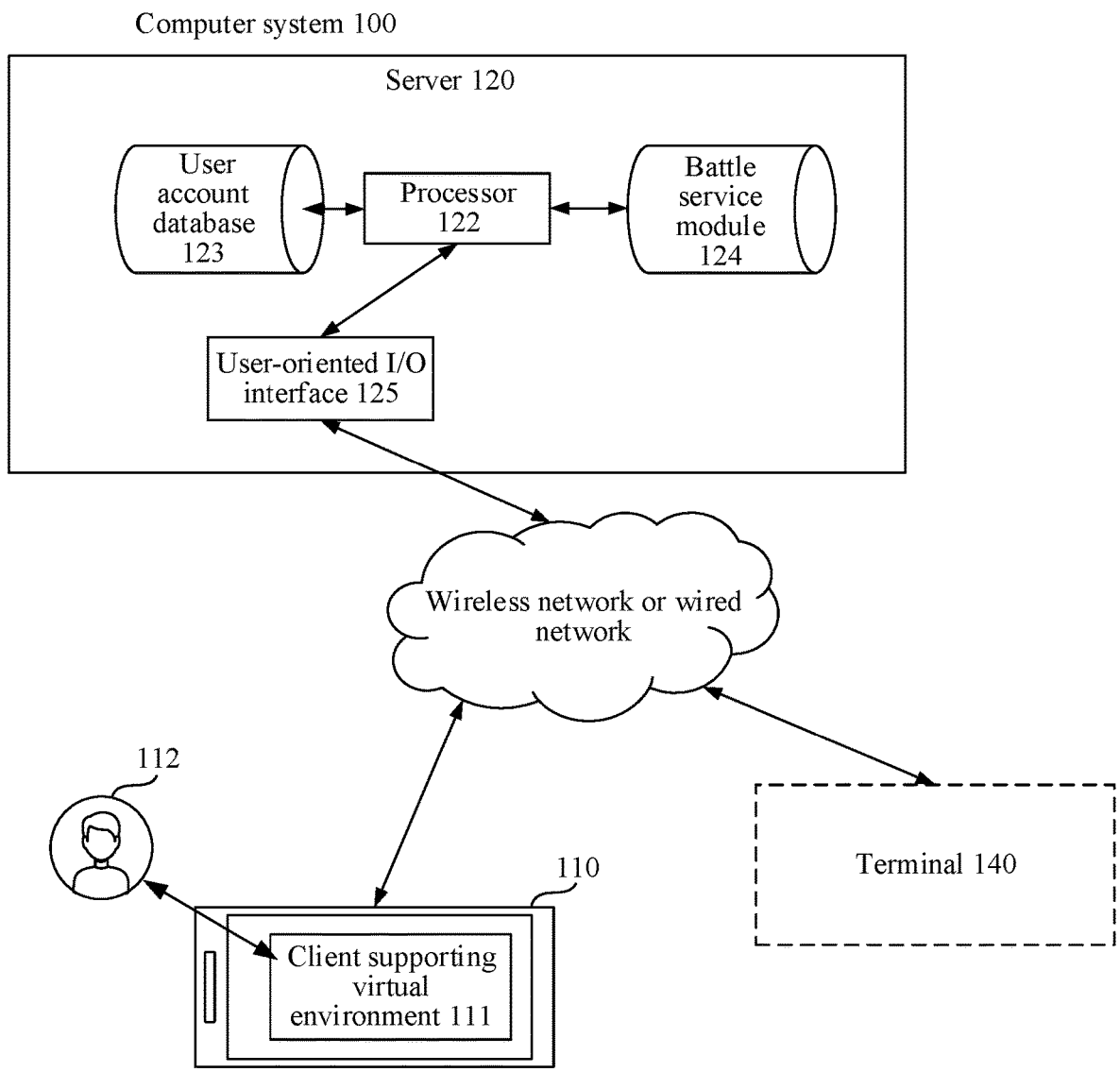
FIG. 1 is a structural block diagram of a computer system provided by an exemplary embodiment of this disclosure.

FIG. 1 is a structural block diagram of a computer system provided by an exemplary embodiment of this disclosure. The computer system 100 includes a terminal 110 and a server 120.

The terminal 110 is installed and runs a client 111 supporting a virtual environment, and the client 111 may be a multiplayer online confrontation program. When the terminal 110 runs the client 111, a user interface of the client 111 is displayed on a screen of the terminal 110. The client may be any one of a battle shooting game, a virtual reality (VR) application, an augmented reality (AR) program, a three-dimensional map program, a virtual reality game, an augmented reality game, a first-person shooting game (FPS), a third-person shooting game (TPS), a multiplayer online battle arena game (MOBA), and a simulation game (SLG). In this embodiment, the client is exemplified as a role playing game. The terminal 110 is a terminal used by a user 112, the user 112 uses the terminal 110 to control a virtual role located in a virtual environment to perform an activity, and the virtual character may be referred to as a main control virtual role of the user 112. The activities of the virtual role include, but are not limited to: at least one of body posture adjusting, crawling, walking, running, riding, flying, jumping, driving, picking, shooting, attaching, and throwing. Illustratively, the virtual role is a virtual character, such as a simulated character or an animated character.

Only one terminal is shown in FIG. 1, but in different embodiments, there are multiple other terminals 140 that may access the server 120. Exemplarily, there are also one or more terminals 140 corresponding to a developer; a development and editing platform for the client supporting the virtual environment is installed on the terminal 140; the developer may edit and update the client on the terminal 140, and transmits the updated client installation package to the server 120 via a wired or wireless network; and the terminal 110 may download the client installation package from the server 120 to implement an update to the client.

The terminal 110 and the terminal 140 are connected to the server 120 through a wireless network or a wired network.

The server 120 includes at least one of one server, a plurality of servers, a cloud calculation platform, and a virtualization center. The server 120 is configured to provide a background service for the client supporting a three-dimensional virtual environment. Exemplarily, the server 120 is responsible for primary calculation work, and the terminals are responsible for secondary calculation work. Alternatively or additionally, the server 120 is responsible for secondary calculation work, and the terminals are responsible for primary calculation work. Alternatively or additionally, collaborative calculation is performed by using a distributed calculation architecture between the server 120 and the terminals.

In one illustrative example, the server 120 includes a processor 122, a user account database 123, a battle service module 124, and a user-oriented input/output interface (I/O interface) 125. The processor 122 is configured to load instructions stored in the server 120 and process data in the user account database 123 and the battle service module 124; the user account database 123 is configured to store data of a user account used by the terminal 110 and the terminal 140, such as a head portrait of the user account, a nickname of the user account, a battle effectiveness index of the user account and a service area where the user account is located; the battle service module 124 is configured to provide a plurality of battle rooms for the users for a battle, such as a 1V1 battle, a 3V3 battle, a 5V5 battle, etc.; the user-oriented I/O interface 125 is configured to establish communications with the terminal 110 and/or the terminal 140 via the wireless or wired network for data exchange.

Figure 2:
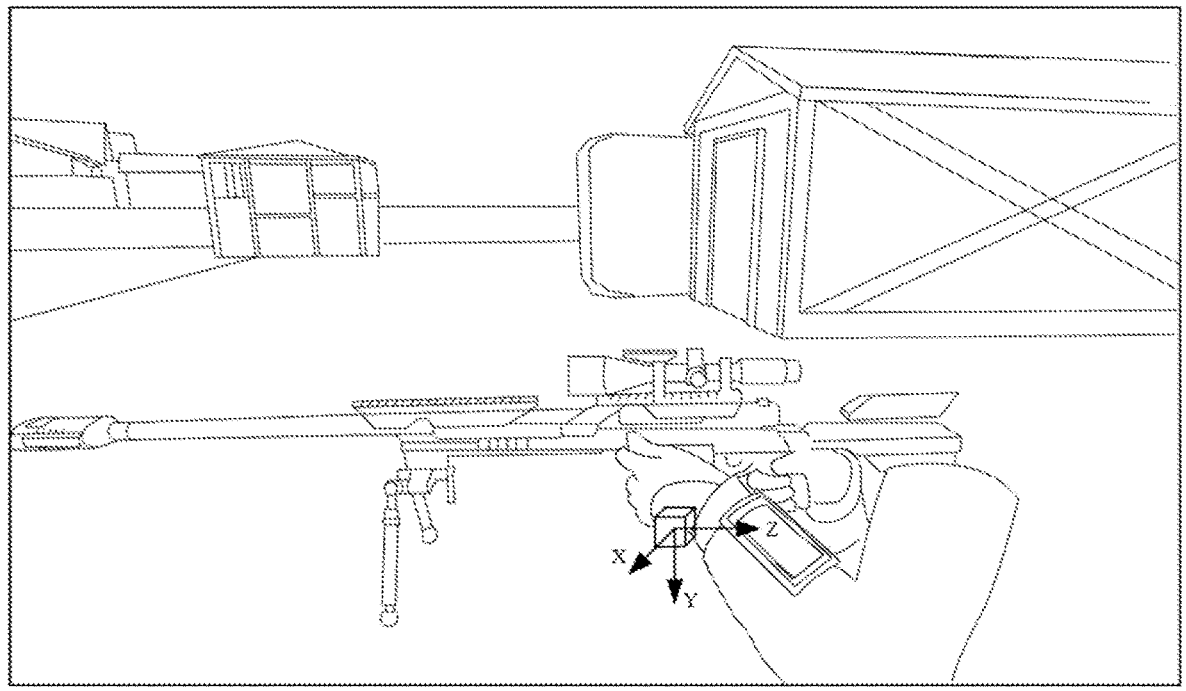
FIG. 2 is a schematic diagram of an interface of a display method for a virtual firearm's shooting provided by an exemplary embodiment of this disclosure.

FIG. 2 is a schematic diagram of an interface of a display method for a virtual firearm's shooting provided by an exemplary embodiment of this disclosure.

As shown in FIG. 2, a virtual firearm and an arm, which control the virtual firearm, of the virtual role are displayed in the virtual scene. A contact point between a left hand of the virtual role and the virtual firearm is selected as a root node of the virtual firearm to establish a coordinate system of the virtual firearm. A back and forth movement direction of the virtual firearm is a Z axis direction; an up and down movement direction of the virtual firearm under the effect of a vertical recoil is a Y axis direction; a left and right movement direction of the virtual firearm under the effect of a horizontal recoil is an X axis direction.

The root node may also be a contact point between a right hand of the virtual role and the virtual firearm, a central point of the virtual firearm, etc.; the coordinate system may also be a polar coordinate system, etc. The selection of the root node and the establishment of the coordinate system are not limited in this application, and an example is given below with only the root node being the contact point between the left hand of the virtual role and the virtual firearm, the coordinate system being a standard Cartesian coordinate system.

Figure 3:
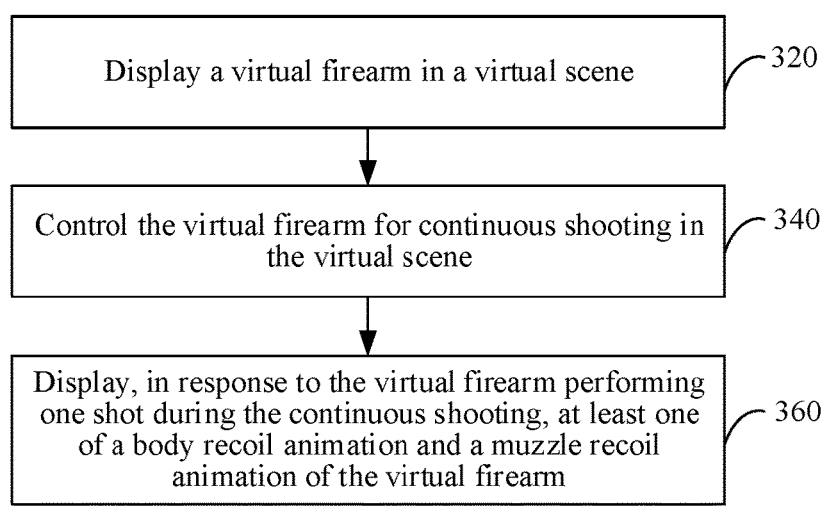
FIG. 3 is a flowchart of a display method for a virtual firearm's shooting provided by an exemplary embodiment of this disclosure.

FIG. 3 is a flowchart of a display method for a virtual firearm's shooting provided by an exemplary embodiment of this disclosure. Illustratively, an example is given below with the method being performed by the terminal 110 (or the client within the terminal 110) shown in FIG. 1. The method includes the following steps:

Step 320: Display a virtual firearm in a virtual scene.

The terminal displays the virtual scene in the currently running client and the virtual firearm in the virtual scene.

Illustratively, the currently running client is taken as an example of a first-person shooting game. The terminal displays the virtual scene in the game and the virtual firearm in the virtual scene. The terminal may also display an arm, holding the virtual firearm, of a virtual role in the virtual scene, or a virtual role holding the virtual firearm, etc. In addition, a user graphical interface displayed by the terminal may also include an operation control such as a shooting control.

Step 340: Control the virtual firearm for continuous shooting in the virtual scene.

There may be various methods for controlling a virtual firearm for continuous shooting in a virtual scene. For example, the user controls the virtual firearm for continuous shooting in the virtual scene by means of a click/tap operation, a press operation, a double-click/tap operation, a voice operation, an eye control, a body sensation control, etc. Alternatively or additionally, the client automatically controls the virtual firearm for continuous shooting in the virtual scene in an auxiliary shooting mode.

Illustratively, the user controls the virtual firearm for continuous shooting in the virtual scene by pressing a shooting control on the graphical user interface; or the user controls the virtual firearm for continuous shooting in the virtual scene by continuously clicking/tapping a shooting control on the user graphical interface. Alternatively or additionally, the user selects the auxiliary shooting mode, and the client automatically controls the firearm for continuous shooting in the virtual scene.

This application does not limit the manner of controlling the virtual firearm for continuous shooting in the virtual scene.

Step 360: Display, in response to the virtual firearm performing one shot during the continuous shooting, at least one of a body recoil animation and a muzzle recoil animation of the virtual firearm.

The body recoil animation is an animation in which a body of the virtual firearm fluctuates according to a fluctuation curve in at least one direction of an X axis and a Y axis. The X axis is used for indicating a horizontal recoil direction of the virtual firearm. The Y axis is used for indicating a vertical recoil direction of the virtual firearm.

The muzzle recoil animation is an animation in which the muzzle of the virtual firearm fluctuates according to a fluctuation curve with the root node of the virtual firearm as the center, that is to say, rotates with the root node of the virtual firearm as the center to realize fluctuation of the muzzle. Fluctuation of the muzzle meets the fluctuation curve.

Illustratively, the fluctuation curve in the body recoil animation or the muzzle recoil animation may be the sinusoid; an amplitude, a frequency, a base amplitude and a sign of the sinusoid may be configured according to the actual situation. For example, different amplitudes and frequencies are configured for different models of virtual firearms; for another example, if different accessories are configured on the same model of virtual firearms, different base amplitudes are configured; for another example, if the same virtual firearm fluctuates in the X axis direction, i.e., under the effect of the horizontal recoil, the sign of the sinusoid is adjusted, etc.

The manner of determining the fluctuation curve is not limited in this application.

Illustratively, when the fluctuation curves in the body recoil animation and the muzzle recoil animation are the sinusoids, in response to the virtual firearm performing one shot during the continuous shooting, the body recoil animation in which a body of the virtual firearm that fluctuates according to a sinusoid in at least one direction of the X axis and the Y axis is displayed. At this time, the body of the virtual firearm fluctuates according to the sinusoid, providing a specific fluctuation mode of the body; the fluctuation mode of the sinusoid is closer to the recoil performance of real shooting.

Illustratively, a base amplitude of the virtual firearm and a recoil factor of the virtual firearm are determined according to a shot count corresponding to a current shot in the continuous shooting, where the recoil factor is positively correlated with the shot count. A first sinusoid is determined according to the base amplitude of the virtual firearm and the recoil factor of the virtual firearm, and the body recoil animation in which the body of the virtual firearm fluctuates according to the first sinusoid in the X axis direction is displayed. Alternatively or additionally, the base amplitude of the virtual firearm and a recoil factor of the virtual firearm are determined according to a shot count corresponding to a current shot in the continuous shooting, where the recoil factor is positively correlated with the shot count. A second sinusoid is determined according to the base amplitude of the virtual firearm and the recoil factor of the virtual firearm. The body recoil animation in which the body of the virtual firearm fluctuates according to the second sinusoid in the Y axis direction is displayed. Alternatively or additionally, the base amplitude of the virtual firearm and a recoil factor of the virtual firearm are determined according to a shot count corresponding to a current shot in the continuous shooting, where the recoil factor is positively correlated with the shot count. The first sinusoid and the second sinusoid are determined respectively according to the base amplitude of the virtual firearm and the recoil factor of the virtual firearm. The body recoil animation in which the body of the virtual firearm fluctuates according to the first sinusoid in the X axis direction and fluctuates according to the second sinusoid in the Y axis direction are displayed.

The manner that the body of the virtual firearm fluctuates in the X axis and the Y axis is described in detail above. In the specific implementation, the body of the virtual firearm will fluctuate according to at least one of them.

Exemplarily, during the current shot, a movement direction of the virtual firearm along the X axis is determined; when the movement direction of the virtual firearm along the X axis is inconsistent with a fluctuation direction of the first sinusoid, the sign of the first sinusoid is changed. At this time, the body of the virtual firearm will be closer to the recoil performance in the real shooting because the violent vibration generated by the recoil in real shooting has a very complex vibration mode, which may generate irregular vibration; Continuously changing the sign of the first sinusoid may be used for simulating irregular vibration.

Illustratively, in response to the virtual firearm performing one shot during the continuous shooting, a muzzle recoil animation in which the muzzle of the virtual firearm fluctuates according to the sinusoid with the root node of the virtual firearm as the center is displayed.

Illustratively, the base amplitude of the virtual firearm and a recoil factor of the virtual firearm are determined according to the shot count corresponding to the current shot in the continuous shooting, where the recoil factor is positively correlated with a shot count; a third sinusoid is determined according to the base amplitude of the virtual firearm and the recoil factor of the virtual firearm; a muzzle recoil animation in which the muzzle of the virtual firearm fluctuates according to the third sinusoid with the root node of the virtual firearm as the center is displayed.

Exemplarily, a first muzzle position and a second muzzle position of the virtual firearm are determined according to the muzzle recoil animation, where the first muzzle position is the position where the muzzle of the virtual firearm is located at the current moment. The second muzzle position is the position where the muzzle of the virtual firearm is located at the next moment. A body position of the virtual firearm is acquired. A first vector of the body position pointing to the first muzzle position and a second vector of the body position pointing to the second muzzle position are constructed. An included angle between the first vector and the second vector is determined as a rotation amount of the muzzle of the virtual firearm relative to the body of the virtual firearm.

Exemplarily, a count threshold of continuous shooting of the virtual firearm is preset. A basic animation of the virtual firearm performing continuous shooting is displayed when a shot count of the continuous shooting is less than or equal to the count threshold, where the basic animation is an animation of the body of the virtual firearm moving back and forth during the continuous shooting; at least one of the body recoil animation and the muzzle recoil animation is superimposed on the basis of the basic animation of the virtual firearm performing the continuous shooting when a shot count of the continuous shooting exceeds the count threshold, and the superimposed animation is displayed. The above provides a possible way for a display opportunity of the recoil animation, which makes the shooting process have rich performance effects and can be closer to the recoil performance in real shooting.

Illustratively, the count threshold of continuous shooting of the virtual firearm is preset to five. When a shot count is less than or equal to 5 times, only a basic animation of the virtual firearm performing continuous shooting is displayed, that is, only an animation of the body of the virtual firearm moving back and forth under the effect of the recoil during continuous shooting is displayed. When a shot count is greater than 5, on the basis of the basic animation of the virtual firearm performing continuous shooting, at least one of the body recoil animation and the muzzle recoil animation is superimposed. The superimposed animation is displayed. For example, a displacement of the body of the virtual firearm moving back and forth during the continuous shooting is determined through the basic animation; displacements of the virtual firearm in the horizontal recoil direction and the vertical recoil direction are determined through the body recoil animation. A rotation angle of the virtual firearm with the root node of the virtual firearm as the center is determined through the muzzle recoil animation. A position and an attitude of the virtual firearm are determined by superimposing the above-mentioned displacement and rotation angle.

The preset count threshold of the virtual firearm performing continuous shooting may be adjusted according to the actual situations, and the method for setting the count threshold and a numerical value are not limited in this application.

In summary, the embodiments of this disclosure provide a shooting performance method for a virtual firearm simulating a recoil performance of a real firearm by displaying the virtual firearm in the virtual scene, controlling the virtual firearm for continuous shooting in the virtual scene, and displaying, in response to the virtual firearm performing one shot during the continuous shooting, at least one of the body recoil animation and the muzzle recoil animation of the virtual firearm. The user can obtain the feeling of real shooting when controlling the virtual firearm to perform continuous shooting, and enhance the hitting feeling during the continuous shooting.

Figure 4:
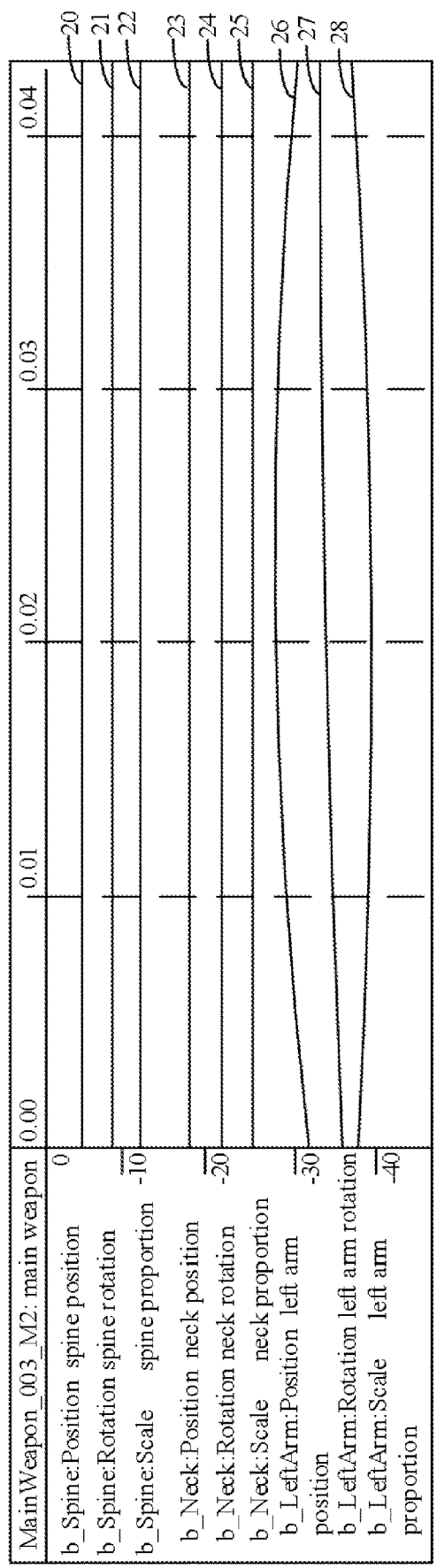
FIG. 4 is a schematic diagram of an animated representation framework of a display method for a virtual firearm's shooting provided by an exemplary embodiment of this disclosure.
Figure 5A:
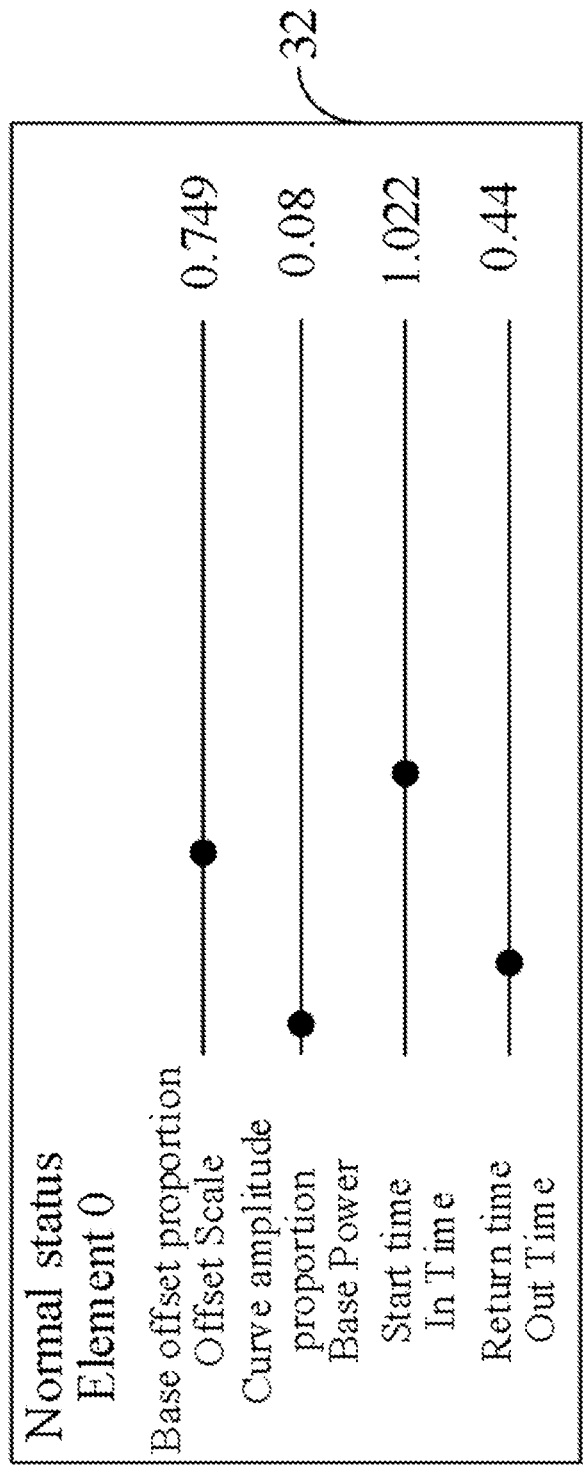
FIGS. 5A-5D are a schematic diagrams of an interface for configuring a firing recoil animation of a virtual firearm in different statuses provided by an exemplary embodiment of this disclosure.
Figure 5B:
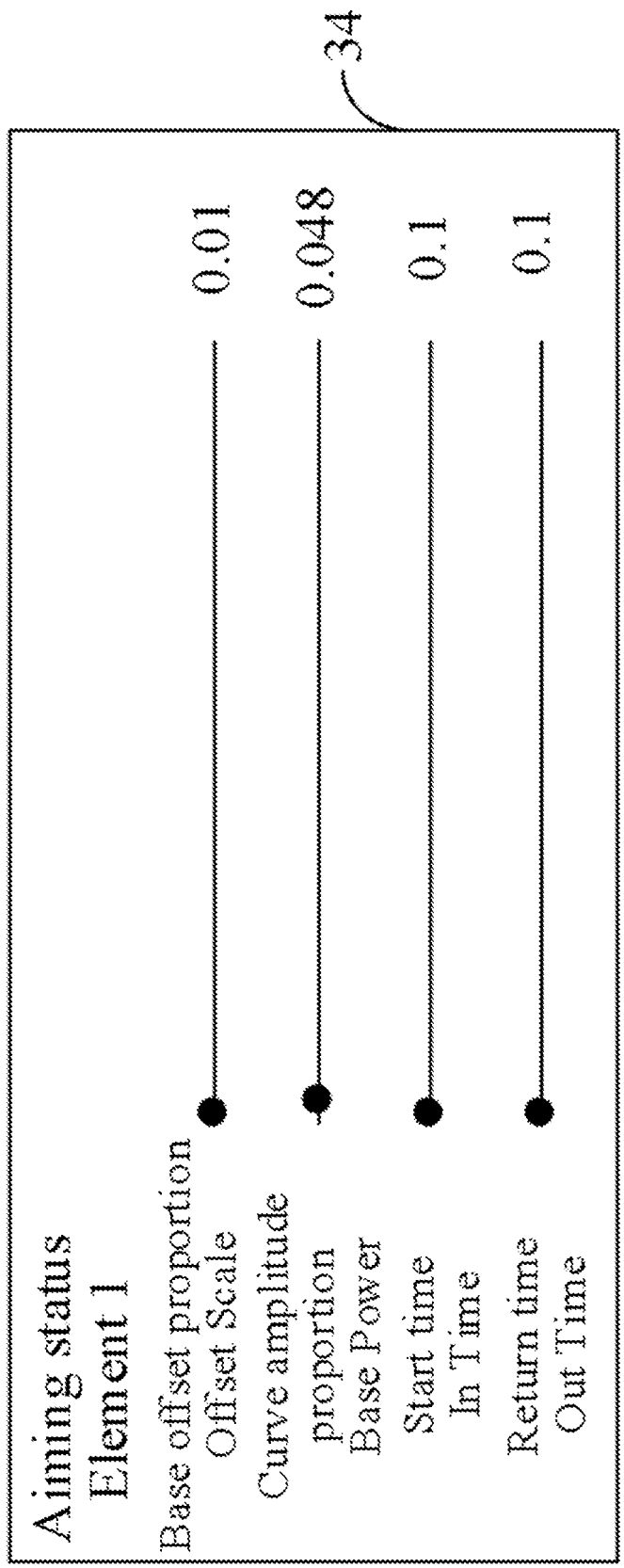
Figure 5C:
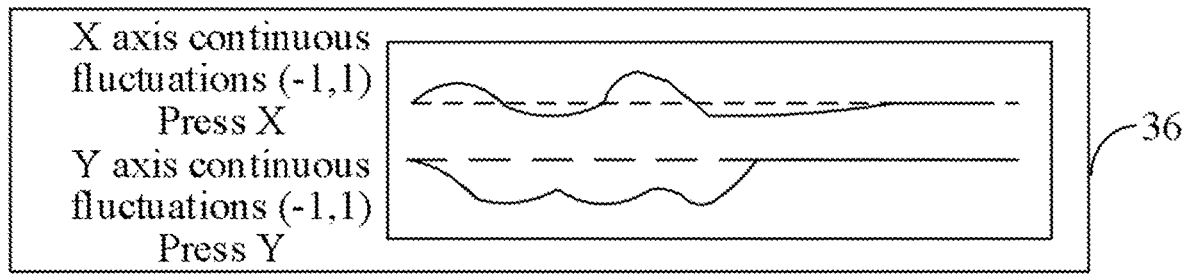
Figure 5D:
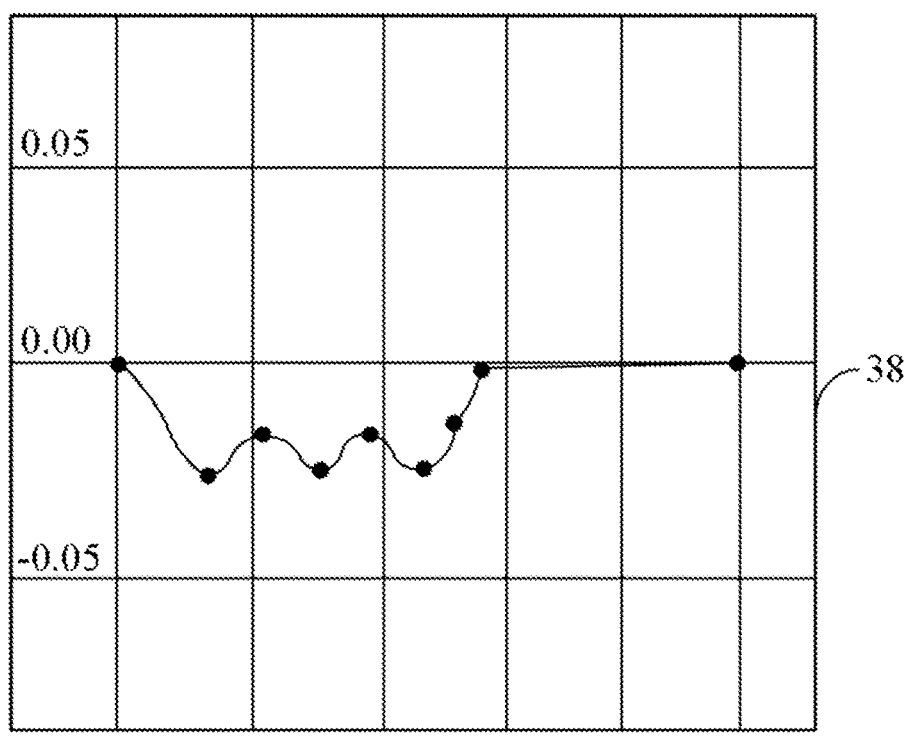

FIG. 4 is a schematic diagram of an animated representation framework of a display method for a virtual firearm's shooting provided by an exemplary embodiment of this disclosure. With a main weapon being a M2 virtual firearm as an example, the animation performance of the virtual firearm during shooting is shown.

Illustratively, the animation of the virtual firearm during the shooting is represented by motion curves for different nodes, where the different nodes include a bone node of a virtual firearm and a body node of the virtual role shooting using the virtual firearm. The motion curves include a position curve, a rotation curve and a proportion curve.

Illustratively, FIG. 4 shows the position, rotation and proportion curves of three body nodes (a spine, a neck, a left arm) of the virtual role holding the virtual firearm for shooting in the shooting display animation of the virtual firearm. As can be seen from the figure, curves 20 to 22 are a spine position curve, a spine rotation curve and a spine proportion curve of the virtual role respectively; curves 23 to 25 are a neck position curve, a neck rotation curve and a neck proportion curve of the virtual role respectively; curves 26 to 28 are a left arm position curve, a left arm rotation curve and a left arm proportion curve of the virtual role respectively. By analogy, the shooting display animation of the virtual firearm is realized by the motion curves of a plurality of body nodes of the virtual role and a plurality of bone nodes of the virtual firearm.

Only one possible animation performance is shown in FIG. 4. Similarly, a motion of the virtual firearm may be represented by selecting bone nodes on the virtual firearm. For example, the root node, the muzzle and a trigger of the virtual firearm are selected to realize the animation of the virtual firearm motion through their respective position curves, rotation curves and proportion curves.

The more the body nodes of the virtual role or the bone nodes of the virtual firearm are selected, the more realistic and exquisite the animation performance is, but the more calculation and memory resources are consumed.

It can be seen from FIG. 4 that the animation displayed during shooting by the virtual firearm is represented by the motion curves for different nodes. Then, parameters such as the amplitude and an offset of the motion curve in different statuses may be configured according to the actual firearm situation.

FIGS. 5A-5D are schematic diagrams of an interface for configuring a firing recoil animation of a virtual firearm in different statuses provided by an exemplary embodiment of this disclosure.

Illustratively, parameters of the virtual firearm in a normal status 32 (i.e., shooting without opening a sighting telescope) and an aiming status 34 (i.e., shooting with opening the sighting telescope) are configured, including a base offset ratio, a curve amplitude ratio, a start time, a return time, etc. The base offset ratio refers to a base offset value of the fluctuation curve. The curve amplitude ratio refers to an amplitude of the fluctuation curve. The start time refers to a time required for the virtual firearm to shoot from a start status. The return time refers to a time required for the virtual firearm to return from an offset position.

Illustratively, FIGS. 5A-5D show a configuration mode in which the base offset ratio, the curve amplitude proportion, the start time and the return time of the virtual firearm during shooting in the normal status 32 are all greater than those in the aiming status 34; that is, the amplitude and the offset of the motion curve of the virtual firearm during shooting in the normal status 32 are greater than those in the aiming status 34; both the start time and the return time of the virtual firearm in the normal status 32 are greater than those in the aiming status 34.

Illustratively, FIGS. 5A-5D also show a possible continuous fluctuation curve 36 of a virtual firearm during shooting according to the above-mentioned configuration. It can be seen from the continuous fluctuation curve 36 that the virtual firearm fluctuates left and right in the X axis direction (namely, in the horizontal direction), that is, the recoil of the virtual firearm in the horizontal direction is switched back and forth in leftward and right ward directions. The virtual firearm fluctuates in only one direction in the Y axis direction (namely, in the vertical direction). That is, the recoil of the virtual firearm in the vertical direction, may be always vertical upward.

The fluctuation curve 38 is a curve obtained by enlarging a certain section of the continuous fluctuation curve 36, and an approximate form of the fluctuation curve, configured in this example, of the virtual firearm can be seen from the fluctuation curve 38.

Figure 6:
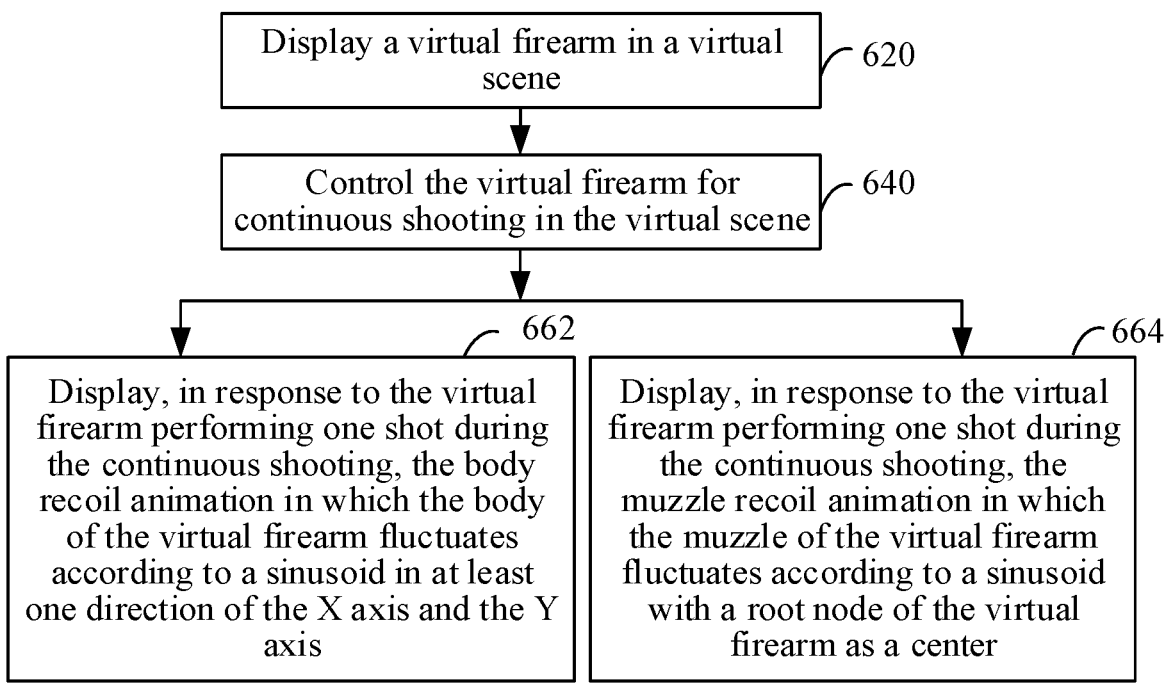
FIG. 6 is a flowchart of a display method for a virtual firearm's shooting provided by an exemplary embodiment of this disclosure.

FIG. 6 is a flowchart of a display method for a virtual firearm's shooting provided by an exemplary embodiment of this disclosure. Illustratively, the method may be performed by the terminal 110 (or a client in the terminal 110) shown in FIG. 1. The method includes the following steps:

Step 620: Display a virtual firearm in a virtual scene.

Referring to step 420, details of the steps have been explained above.

Step 640: control the virtual firearm for continuous shooting in the virtual scene.

Referring to step 440, details of the steps have been explained above.

Step 662: Display, in response to the virtual firearm performing one shot during the continuous shooting, the body recoil animation in which the body of the virtual firearm fluctuates according to a sinusoid in at least one direction of the X axis and the Y axis.

In the following, the body of the virtual firearm fluctuating according to the sinusoid in the X axis direction and in the Y axis direction will be described.

FIG. 7 is a flowchart of displaying, in response to the virtual firearm performing one shot during the continuous shooting, the body recoil animation in which the body of the virtual firearm fluctuates according to a first sinusoid in the X axis direction.

Step 6621: Determine, according to a shot count corresponding to a current shot in the continuous shooting, a base amplitude of the virtual firearm and a recoil factor of the virtual firearm, where the recoil factor is positively correlated with a shot count.

First, the contents of determining the base amplitude of virtual firearms are introduced.

In one embodiment, the base amplitude of the virtual firearm is a function value calculated from a sinusoid. Illustratively, an expression of the sinusoid is m(t)=A*sin (ω*Δt), where A represents an amplitude of the sinusoid, ω represents a frequency of the sine function, and A and ω are both pre-configured constants. Δt is used for indicating a time difference between a current shot and a first shot. By substituting the time difference Δt between the current shot and the first shot into an expression of sinusoid to acquire a base amplitude A0 of the virtual firearm in the current shot.

Then, the contents of determining the recoil factor of the virtual firearm are introduced.

In one embodiment, a recoil factor RecoilFactor in the horizontal direction may be determined by the formula RecoilFactor=RecoilLateralBase*RecoilLateralBaseScale+RecoilLateralModifier*(shot count−1). RecoilLateralBase represents a recoil base value in the horizontal direction; RecoilLateralBaseScale represents a recoil base value proportion in the horizontal direction; RecoilLateralModifier represents a recoil adjustment value in the horizontal direction. It can be seen from the calculation formula of the recoil factor that the recoil factor is positively correlated with the shot count, that is, the greater the shot count is, the greater the recoil factor is.

The above-mentioned three parameters may be flexibly configured according to the actual situations. In one possible implementation, a numerical value of the curve amplitude proportion in FIGS. 5A-5D is taken as RecoilLateralBase; a numerical value of the base offset proportion in FIGS. 5A-5D is taken as RecoilLateralBaseScale; a numerical value of RecoilLateralModifier is determined according to the number and types of accessories on the virtual firearm. This application does not limit the selection mode of the parameters in the calculation formula of the recoil factor.

Illustratively, a time of the first shot in consecutive n shots is recorded, and for the $i^{th}$ shot in the consecutive n shots, the time for the first shot is subtracted from a time for the $i^{th}$ shot to obtain the time difference Δt between the time for the first shot and the time for the $i^{th}$ shot; Alternatively or additionally, a pre-configured time interval between two adjacent shots of the virtual firearm during continuous shooting is multiplied by the number of shooting intervals. That is, i−1, to obtain the time difference Δt between the $i^{th}$ shot and the first shot. By substituting Δt into the formula m(t)=A*sin(ω*Δt), the calculation result is determined as the base amplitude A0 of the virtual firearm in the current shot.

Illustratively, the recoil factor RecoilFactor for the $i^{th}$ shot is determined by substituting the shot count i into the above-mentioned calculation formula of the recoil factor.

Step 6622: Determine a first sinusoid according to a base amplitude of the virtual firearm and a recoil factor of the virtual firearm.

In one embodiment, a first product of the base amplitude of the virtual firearm and the recoil factor is calculated, and the first product is taken as a maximum fluctuation amplitude of the first sinusoid.

Illustratively, a sinusoid that a body of the virtual firearm fluctuates in the X axis direction is constructed as M(t)=A1*sin(ω*(t−t0))+A0, where A1 is an actual fluctuation amplitude for the $i^{th}$ shot, and A0 is a base amplitude for the $i^{th}$ shot; T is the current time, and t0 is the time for the $i^{th}$ shot.

Illustratively, in step 6621, the base amplitude A0 and recoil factor RecoilFactor for the $i^{th}$ shot are determined; the actual fluctuation amplitude A1 for the $i^{th}$ shot is determined by the formula A1=A0*RecoilFactor.

Illustratively, the time to for the $i^{th}$ shot and the actual fluctuation amplitude A1 for the $i^{th}$ shot are substituted into the constructed sinusoid, where t0 determine the first sinusoid as M1(t)=A1*sin(ω*(t−t0))+A0.

In another embodiment, the base amplitude of the virtual firearm is taken as the maximum fluctuation amplitude of the first sinusoid; the recoil factor is taken as an angular velocity of the first sinusoid.

Illustratively, a sinusoid that the body of the virtual firearm fluctuates in the X axis direction is constructed as M(t)=A0*sin(ω*(t−t0)), where A0 is the actual fluctuation amplitude of the $i^{th}$ shot; t is the current time; t0 is the time for the $i^{th}$ shot; co is the recoil factor RecoilFactor.

The above provides two modes of determining the first sinusoid, where the recoil factor is taken a factor of changing the amplitude or as a factor of changing the angular velocity. It provides two modes of changing the fluctuation curve, so that the fluctuation curve finally generated has rich performance effect and can also be closer to the recoil performance during real shooting.

Step 6623: Determine, during a current shot, a movement direction of the virtual firearm along the X axis.

Since the recoil of the virtual firearm in the X axis direction, i.e., the recoil in the horizontal direction, may be directed to the left or to the right to switch between the two directions, it can be considered to adjust the first sinusoid according to the movement direction of the virtual firearm along the X axis in the current shot.

Illustratively, in the $i^{th}$ shot, a tangent is made to the curve of a current movement of the virtual firearm, and a current movement direction of the virtual firearm along the X axis is determined according to a slope of the tangent. For example, when the slope is positive, it is determined that the virtual firearm moves to the right along the X axis; when the slope is negative, it is determined that the virtual firearm moves to the left along the X axis.

This disclosure does not limit the method of determining the movement direction of the virtual firearm along the X axis.

Step 6624: Change a sign of the first sinusoid when the movement direction of the virtual firearm along the X axis is inconsistent with a fluctuation direction of the first sinusoid.

The movement direction of the virtual firearm along the X axis in the current shot is determined in step 6623; when the movement direction is inconsistent with the fluctuation direction of the first sinusoid, the sign of the first sinusoid is changed, that is, the fluctuation direction of the first sinusoid is changed.

Illustratively, if the slope of the tangent of the motion curve of the virtual firearm in the $i^{th}$ shot, it is determined that the virtual firearm moves to the left along the X axis; while the first sinusoid fluctuates to the right; at this time, the sign of the first sinusoid is changed into M1(t)=−A1*sin(ω*(t−t0))+A0.

Step 6625: Display a body recoil animation in which the virtual firearm fluctuates according to the first sinusoid in the X axis direction.

After the first sinusoid of the virtual firearm is determined in the above-mentioned step, the body recoil animation in which the virtual firearm fluctuates according to the first sinusoid in the X axis direction is displayed.

Figure 8:
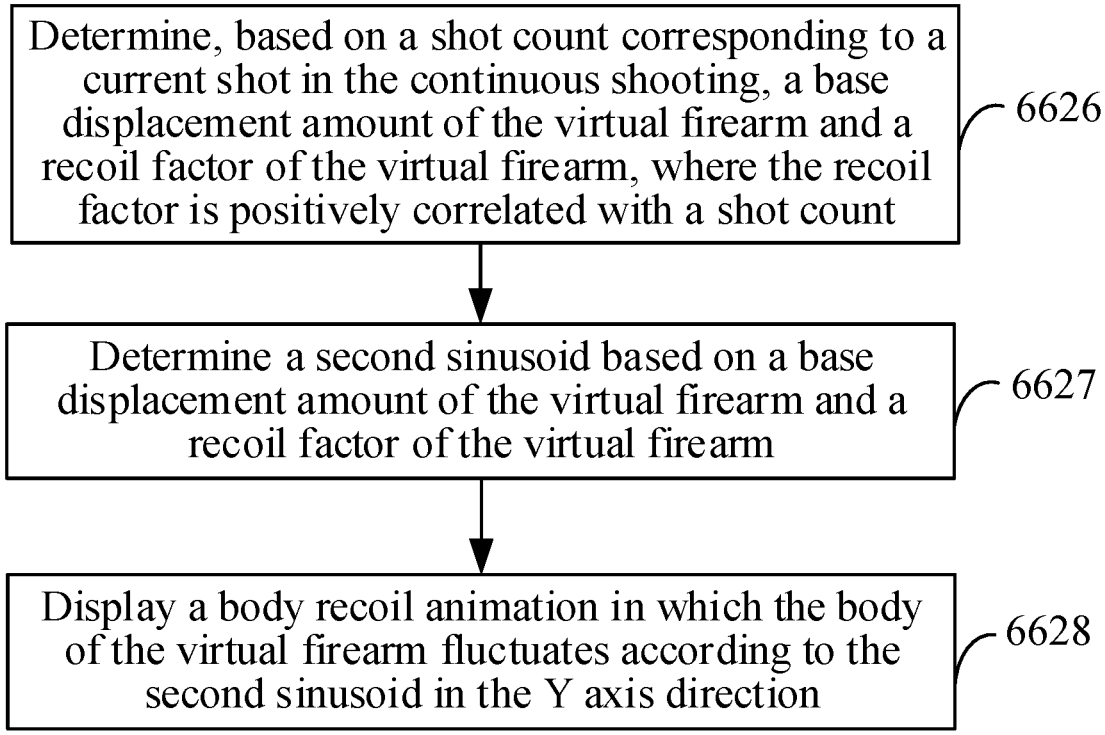
FIG. 8 is a flowchart of a method of displaying a body recoil animation in which a body of a virtual firearm fluctuates according to a second sinusoid in a Y axis direction provided by an exemplary embodiment of this disclosure.

(2) FIG. 8 is a flowchart of displaying, in response to the virtual firearm performing one shot during the continuous shooting, the body recoil animation in which the body of the virtual firearm fluctuates according to a second sinusoid in the Y axis direction.

The step of determining the second sinusoid may be similar to the step of determining the first sinusoid. For example, a difference from the step of determining the first sinusoid is in parameter configuration. Different parameters may be selected according to the actual situations. For example, different amplitude values A are selected to configured for the sinusoid m(t), etc.

Since the Y axis direction, i.e., the recoil in the vertical direction, may be always vertically upward, if the second sinusoid that virtual firearm fluctuates in the Y axis direction is determined, there may be no need for adjusting the second sinusoid according to the motion direction of the virtual firearm. That is, step 6623 and step 6624 may be skipped.

Step 6626: Determine, according to a shot count corresponding to a current shot in the continuous shooting, a base amplitude of the virtual firearm and a recoil factor of the virtual firearm, where the recoil factor is positively correlated with a shot count, Details of this step have been disclosed in step 6621, and will not be repeated here.

Step 6627: Determine a second sinusoid according to the base amplitude of the virtual firearm and the recoil factor of the virtual firearm;

In one embodiment, a second product of the base amplitude and the recoil factor of the virtual firearm is calculated; the second product is taken as a maximum fluctuation amplitude of the second sinusoid; Alternatively or additionally, the base amplitude of the virtual firearm is taken as a maximum fluctuation amplitude of the second sinusoid; the recoil factor is taken as an angular velocity of the second sinusoid, Details of this step have been disclosed in step 6622, and will not be repeated here.

Step 6628: Display a body recoil animation in which the virtual firearm fluctuates according to the second sinusoid in the Y axis direction, Details of this step have been disclosed in step 6625, and will not be repeated here.

Steps 6621 to 6625, and steps 6626 to 6628 may be performed alternatively or both without limiting the performing order of the two. That is, only the first sinusoid may be determined, and the body recoil animation in which the body of the virtual firearm fluctuates according to the first sinusoid in the X axis direction may be displayed. Alternatively or additionally, only the second sinusoid is determined, and the body recoil animation in which the body of the virtual firearm fluctuates according to the second sinusoid in the Y axis direction is displayed. Alternatively or additionally, the first sinusoid and the second sinusoid are determined separately, and a recoil animation in which the body of the virtual firearm fluctuates according to the first sinusoid in the X axis direction and the second sinusoid in the Y axis direction is displayed.

This application does not limit the selection and execution order of the above-mentioned steps.

The above-mentioned manner of determining the first sinusoid and the second sinusoid respectively includes:

In one embodiment, a first product of a base amplitude and a recoil factor of a virtual firearm is calculated; the first product is taken as a maximum fluctuation amplitude of the first sinusoid. A second product of the base amplitude and the recoil factor of the virtual firearm is calculated; the second product is taken as a maximum fluctuation amplitude of the second sinusoid.

In another embodiment, the base amplitude of the virtual firearm is taken as the maximum fluctuation amplitude of the first sinusoid, and the recoil factor is taken as an angular velocity of the first sinusoid. The base amplitude of the virtual firearm is taken as a maximum fluctuation amplitude of the second sinusoid, and the recoil factor is taken as an angular velocity of the second sinusoid, Details of this step have been disclosed in step 6622, and will not be repeated here.

Step 664: Display, in response to the virtual firearm performing one shot during the continuous shooting, the muzzle recoil animation in which the muzzle of the virtual firearm fluctuates according to a sinusoid with a root node of the virtual firearm as a center.

Figure 9:
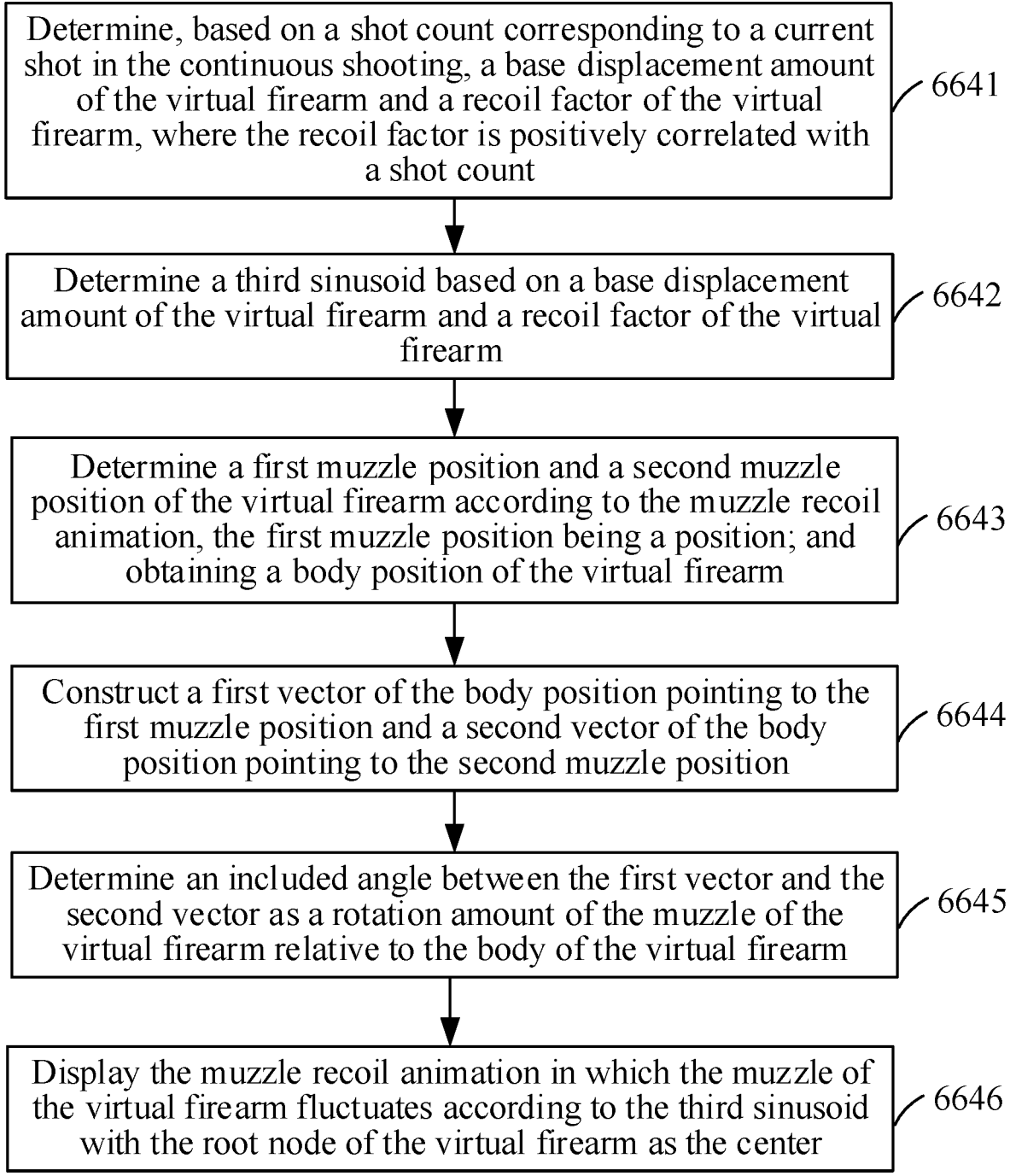
FIG. 9 is a flowchart of a method of displaying a muzzle recoil animation in which a muzzle of a virtual firearm fluctuates according to a third sinusoid provided by an exemplary embodiment of this disclosure.

FIG. 9 is a flowchart of displaying, in response to the virtual firearm performing one shot during the continuous shooting, the muzzle recoil animation in which a muzzle of the virtual firearm fluctuates according to a sinusoid with a root node of the virtual firearm as a center. At this time, the muzzle of the virtual firearm fluctuates according to a sinusoid, providing a specific fluctuation mode of the muzzle, and the fluctuation mode of the sinusoid is closer to the recoil performance of a real fire.

Step 6641: Determine, according to a shot count corresponding to a current shot in the continuous shooting, a base amplitude of the virtual firearm and a recoil factor of the virtual firearm, where the recoil factor is positively correlated with a shot count.

Details of this step have been disclosed in step 6621, and will not be repeated here.

Step 6642: Determine a third sinusoid according to the base amplitude of the virtual firearm and the recoil factor of the virtual firearm.

In one embodiment, a third product of the base amplitude of the virtual firearm and the recoil factor is calculated; the third product is taken as a maximum fluctuation amplitude of the third sinusoid.

Alternatively or additionally, in another embodiment, the base amplitude of the virtual firearm is taken as the maximum fluctuation amplitude of the third sinusoid; the recoil factor is taken as an angular velocity of the third sinusoid.

The above provides two modes of determining the third sinusoid, which take the recoil factor as a factor of changing the amplitude or the recoil factor as a factor of changing the angular velocity. It provides two modes of changing the fluctuation curve, so that the fluctuation curve finally generated has rich performance effect and can also be closer to the recoil performance during real shooting, Details of this step have been disclosed in step 6622, and will not be repeated here.

Step 6643: Determine a first muzzle position and a second muzzle position of the virtual firearm according to the muzzle recoil animation, the first muzzle position being a position; and acquire a body position of the virtual firearm.

The first muzzle position is a position where the muzzle of the virtual firearm is located at the current moment, and the second muzzle position is a position where the muzzle of the virtual firearm is located at a next moment, that is, a target motion position of the muzzle of the virtual firearm.

The first muzzle position where the muzzle of the virtual firearm is located and the body position of the virtual firearm at the current moment are acquired. The body position of the virtual firearm may be represented by the root node of the virtual firearm.

According to the third sinusoid acquired in step 6642, the second muzzle position where the muzzle of the virtual firearm is located at the next moment is determined. The next moment may be a next frame, or the next moment separated by several frames.

Step 6644: Construct a first vector of the body position pointing to the first muzzle position and a second vector of the body position pointing to the second muzzle position.

Illustratively, the body position of the virtual firearm is represented by a position of the root node of the virtual firearm. The first vector of the body position pointing to the first muzzle position and the second vector of the body position pointing to the second muzzle position are constructed. That is, a first vector of the position of the root node of the virtual firearm pointing to the first muzzle position and a second vector of the position of the root node of the virtual firearm pointing to the second muzzle position are constructed.

Step 6645: Determine an included angle between the first vector and the second vector as a rotation amount of the muzzle of the virtual firearm relative to the body of the virtual firearm.

The first vector is represented by a vector $\vec{A}$, the second vector is represented by a vector $\vec{B}$, and an included angle θ between the first vector and the second vector is determined by the following formula:

$$\theta = \operatorname{atan2}(\sin(\theta), \cos(\theta)) = \operatorname{atan2}((\vec{A} \times \vec{B}) * \vec{n}, \vec{A} * \vec{B}) = \operatorname{atan2}((\vec{A} \times \vec{B}) \cdot \operatorname{norm}(\ ), \vec{A} * \vec{B})$$

Where atan2 represents an arctangent function; $\vec{n}$ represents a unit vector; * represents a point multiplication of a vector, the result of which is a number; x represents a cross multiplication of a vector, the result of which is a vector; norm ( ) represents a function that assigns a length and a size to a vector.

The included angle, calculated by the above-mentioned formula, between the first vector and the second vector is determined as a rotation amount of the muzzle of the virtual firearm relative to the body of the virtual firearm.

Step 6646: Display the muzzle recoil animation in which the muzzle of the virtual firearm fluctuates according to the third sinusoid with the root node of the virtual firearm as the center.

The muzzle recoil animation in which the muzzle of the virtual firearm fluctuates according to the third sinusoid with the root node of the virtual firearm as the center is displayed. The implementation of the muzzle recoil animation is the rotation amount, determined in step 6645, of the muzzle of the virtual firearm relative to the body of the virtual firearm. At this time, the rotation amount of the muzzle of the virtual firearm relative to the body of the virtual firearm is acquired for determining an angular relationship between the muzzle and the body, and the muzzle recoil animation is played according to the angular relationship between the muzzle and the body. Since the muzzle and the body are both components of the virtual firearm, and a strict positional relationship between the two may need to be considered during playing of the recoil animation, thereby ensuring the unity and the coordination of the recoil animation of the two.

Step 662 and step 664 may be performed alternatively or both; that is, only step 662 may be performed to display the body recoil animation of the virtual firearm; Alternatively or additionally, only step 664 is performed to display the muzzle recoil animation of the virtual firearm; Alternatively or additionally, both step 662 and step 664 may be executed regardless of the performing order, and the body recoil animation and the muzzle recoil animation may be displayed in a superimposing manner. This application does not limit the selection and performing order of the above-mentioned steps.

In summary, the embodiments of this disclosure provide a display method for a virtual firearm's shooting close to real shooting by displaying the virtual firearm in the virtual scene, controlling the virtual firearm for continuous shooting in the virtual scene, calculating at least one of the first sinusoid that the virtual firearm fluctuates in the X axis direction, the second sinusoid that the virtual firearm fluctuates in the Y axis direction and the third sinusoid that the muzzle fluctuates after one shot in the continuous shooting, and displaying the animation corresponding to the calculated sinusoids, so that the user experiences a stronger hitting feeling during virtual shooting.

Figure 10:
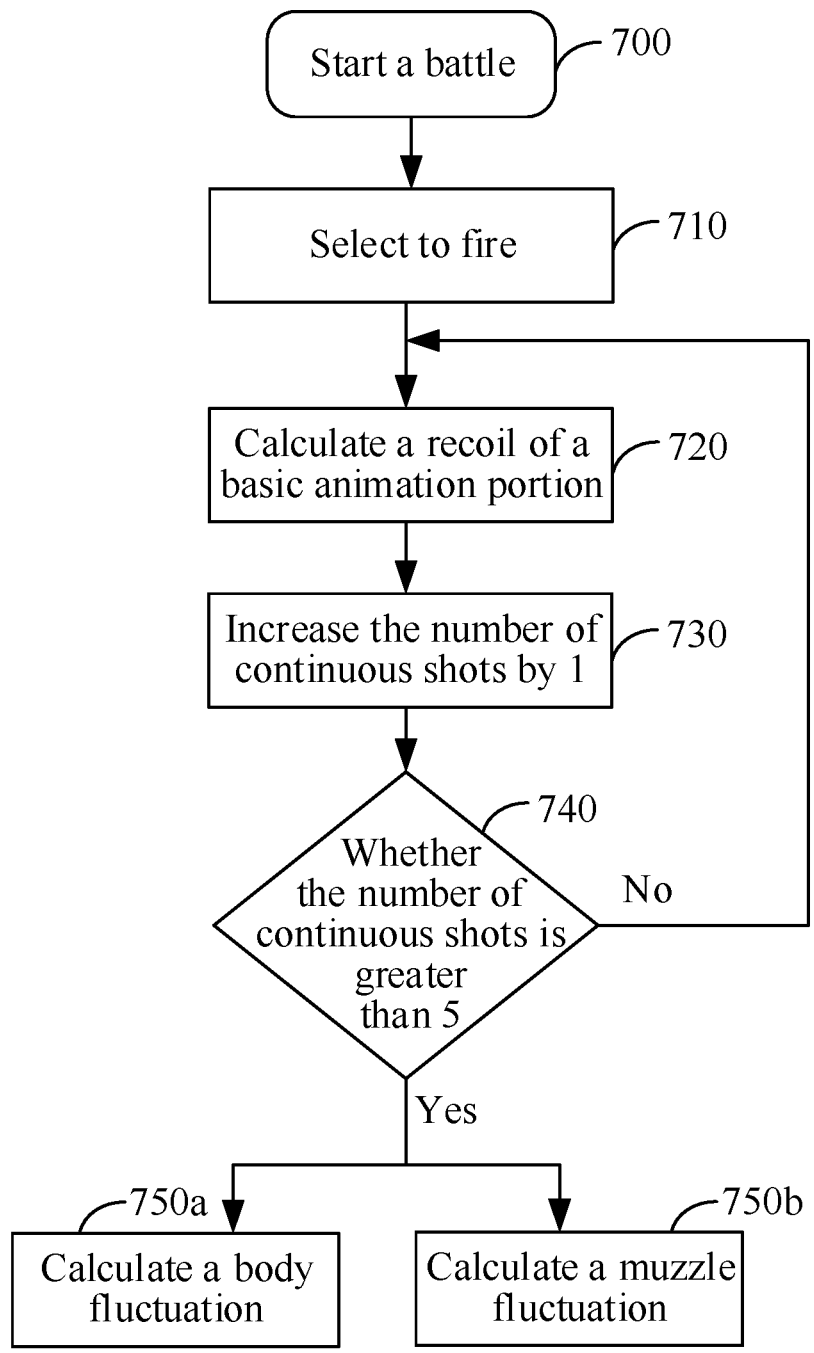
FIG. 10 is a flowchart of a display method for a virtual firearm's shooting provided by an exemplary embodiment of this disclosure.
Figure 11:
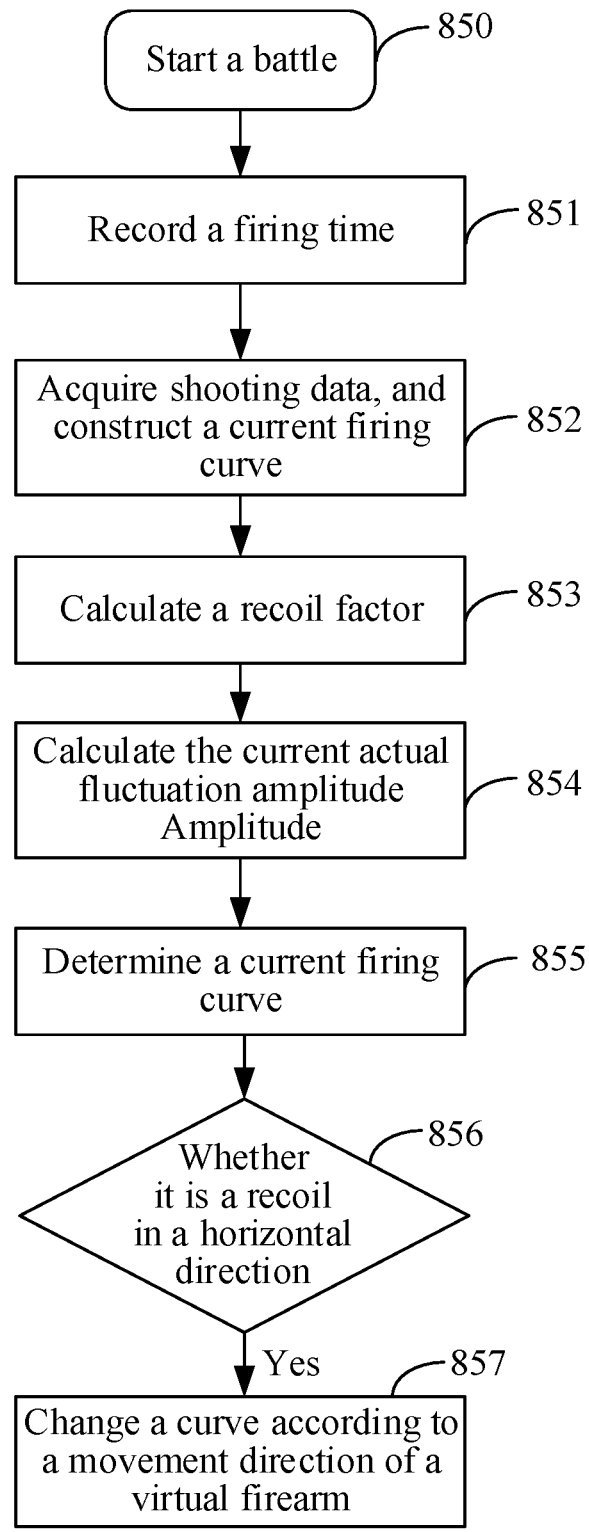
FIG. 11 is a flowchart of displaying a body recoil animation in which a body of a virtual firearm provided by an exemplary embodiment of this disclosure.
Figure 12:
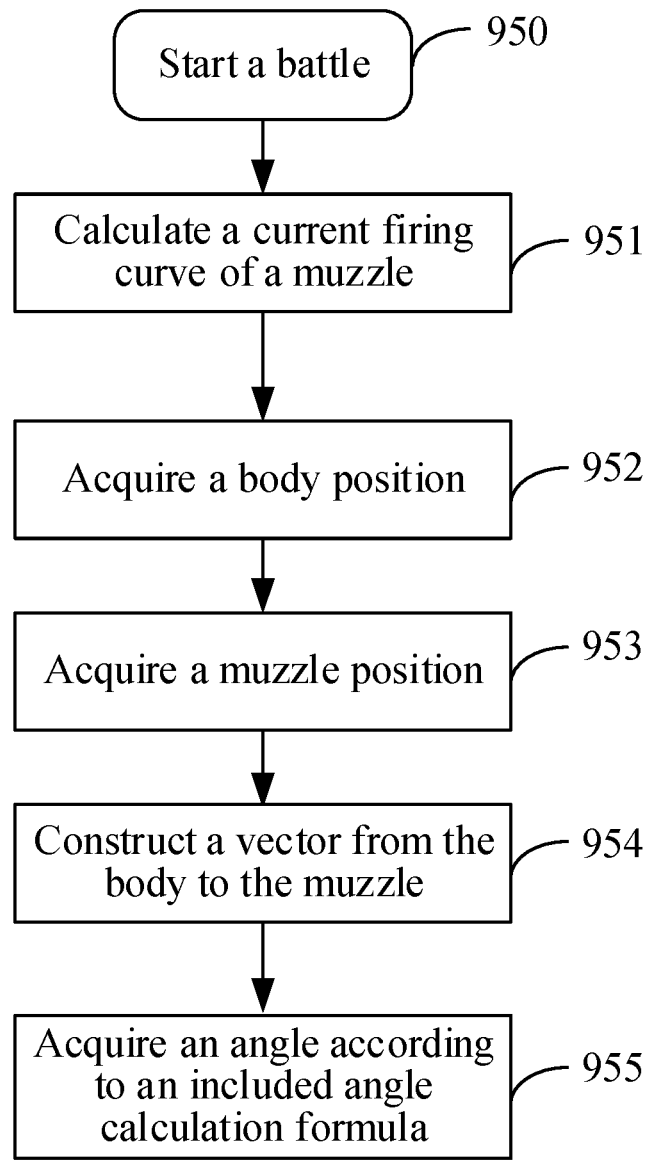
FIG. 12 is a flowchart of displaying a muzzle recoil animation of a virtual firearm provided by an exemplary embodiment of this disclosure.

FIGS. 10 to 12 are flowcharts of a display method for a virtual firearm's shooting provided by an exemplary embodiment of this disclosure. This embodiment exemplifies a first-person shooter game with a shot count threshold of five. Illustratively, the method may be performed by the terminal 110 (or the client in the terminal 110) shown in FIG. 1. The method includes the following steps:

FIG. 10 is an overall flowchart of an embodiment of this disclosure:

Step 700: Start a battle. Illustratively, a virtual firearm is displayed in a virtual scene.

Step 710: Select to fire. Illustratively, the virtual firearm in the virtual scene is controlled for continuous shooting.

Step 720: Calculate a recoil of a basic animation portion. The basic animation is an animation in which a body of the virtual firearm moves back and forth during continuous shooting.

Illustratively, a displacement of the virtual firearm on the Z axis, i.e., displacement data of back and forth movement of the body of the virtual firearm during continuous shooting, is determined by an animation curve in the basic animation.

Step 730: Increase the number of continuous shots by 1. After a current shot, a shot count, i.e., the number of continuous shots, is increased by 1. Illustratively, continuous i shots have been executed before the current shot, and the shot count is increased by 1 after a current shot, i.e., i=i+1.

Step 740: Determine whether the number of continuous shooting is greater than 5. In this embodiment, the count threshold value is set to be 5, so it is determined whether the shot count is greater than 5. Illustratively, when the number of continuous shooting, i.e. the shot count, is smaller than or equal to 5, only the basic animation in which the virtual firearm performs continuous shooting is displayed. The method returns to step 720. When the number of continuous shooting, i.e. the shot count, is greater than 5, at least one of the body recoil animation and the muzzle recoil animation is superimposed on the basis of the basic animation in which the virtual firearm performs continuous shooting.

Step 750a: Calculate a body fluctuation. Sees descriptions in FIG. 11 for details in the following.

Step 750b: Calculate a muzzle fluctuation. Sees descriptions in FIG. 12 for details in the following. Steps 750a and 750b may be performed alternatively or both; when both steps 750a and 750b are performed, the performing order is not limited. This application does not limit selection and the performing order of calculation of the body fluctuation and the muzzle fluctuation.

FIG. 11 shows detailed steps for calculating the body fluctuation in this embodiment of this disclosure.

Step 850: Start a battle.

Step 851: Record a firing time. Illustratively, for the $i^{th}$ shot in the continuous n shots, its shooting time, i.e., the firing time, is denoted as t0.

Step 852: Acquire shooting data, and construct a current firing curve. The shooting data is acquired, and includes a shot count, a time from a first shot, a current time, etc.

The current firing curve is constructed as $M(t)=A1*\sin(\omega*(t-t0))+A0$, where A1 is an actual fluctuation amplitude, ω is a fluctuation frequency, t is the current time, t0 is the firing time of the current shot, and A0 is a base amplitude.

The current firing curve here includes at least one of a current firing curve in a horizontal direction and a current firing curve in a vertical direction.

Step 853: Calculate a recoil factor.

Illustratively, taking a recoil factor in the horizontal direction as an example, the recoil factor is determined by the formula RecoilFactor=RecoilLateralBase*RecoilLateralBaseScale+ RecoilLateralModifier*(i−1), where RecoilLateralBase represents a recoil base value in the horizontal direction; RecoilLateralBaseScale represents a recoil base value ratio in the horizontal direction; RecoilLateralModifier represents a recoil adjustment value in the horizontal direction. It can be seen from the calculation formula of the recoil factor that the recoil factor is positively correlated with the shot count, that is, the greater the shot count is, the greater the recoil factor is.

The recoil factor in the vertical direction is similar to that in the horizontal direction and will not be described here.

Step 854: Calculate the current actual fluctuation amplitude.

The base amplitude A0 is determined through a sinusoid expression m(t)=A*sin(ω*Δt), where A represents an amplitude of a sinusoid; ω represents a frequency of the sinusoid; A and ω are both pre-configured constants; Δt is used for indicating a time difference between the current shot and the first shot. By substituting the time difference between the current shot and the first shot into an expression of sinusoid, a base amplitude A0 of the virtual firearm in the current shot can be acquired.

According to the above-mentioned base amplitude A0 and recoil factor RecoilFact or, the actual fluctuation amplitude A1=A0*RecoilFactor is determined, and A1 is the actual fluctuation amplitude of the fluctuation curve after the current shot.

Step 855: Determine a current firing curve.

By substituting the parameters calculated above into the current firing curve M(t) constructed in step 852, the current firing curve M(t)=A1*sin(ω*(t−t0))+A0 is obtained.

The firing curve M(t) includes at least one of the current firing curve in the horizontal direction and the current firing curve in the vertical direction.

Step 856: Determine whether it is a recoil in the horizontal direction.

Since a recoil in the vertical direction may be always upward and the recoil in the horizontal direction may be bi-directional, it is necessary to determine whether the recoil is in the horizontal direction, that is, whether the current firing curve in step 855 corresponds to a fluctuation curve in the horizontal direction.

when it is the fluctuation curve in the horizontal direction, then step 857 is executed; when it is the fluctuation curve in the vertical direction, the current firing curve is directly determined as the fluctuation curve in the vertical direction, that is, the second sinusoid described in the foregoing embodiment.

Step 857: Change the curve according to the movement direction of the virtual firearm.

In the current shot, a tangent is made to the curve of a current movement of the virtual firearm, and a current movement direction of the virtual firearm in the horizontal direction is determined according to a slope of the tangent. For example, when the slope is positive, it is determined that the virtual firearm moves to the right in the horizontal direction; when the slope is negative, it is determined that the virtual firearm moves to the left in the horizontal direction.

When the virtual firearm moves to the right, the curve keeps unchanged; when the virtual firearm moves to the left, in order to ensure that the fluctuation direction of the fluctuation curve is consistent with the movement direction of the virtual firearm, the sign of the fluctuation curve is changed. For example, the current firing curve determined in step 855 is changed to M(t)=−A1*sin(ω*(t−t0))+A0.

The fluctuation curve in the horizontal direction, i.e., the first sinusoid described in the forgoing embodiments, is obtained in step 857.

FIG. 12 shows detailed steps for calculating the muzzle fluctuation in this embodiment of this disclosure.

Step 950: Start a battle.

Step 951: Calculate a current firing curve of a muzzle.

The manner of calculating the current firing curve of the muzzle is similar to the steps shown in FIG. 11 and will not be described in detail herein.

Step 952: Acquire a body position.

Illustratively, the body position is acquired through a basic animation; Alternatively or additionally, the body recoil animation is superimposed by the basic animation, and the body position is acquired from the superimposed animation.

Illustratively, a position of a root node of the virtual firearm is used to represent the body position of the virtual firearm.

Step 953: Acquire a muzzle position.

Illustratively, the muzzle position is acquired through a current firing curve of the muzzle, including a first muzzle position where the muzzle is located currently, and a second muzzle position where the muzzle is located at a next moment, i.e., a target motion position of the muzzle.

Step 954: Construct a vector from the body to the muzzle.

Illustratively, a first vector of the root node of the virtual firearm pointing to a first muzzle position of the virtual firearm is constructed, represented by the vector $\vec{A}$; a second vector of the root node of the virtual firearm pointing to a second muzzle position of the virtual firearm is constructed, represented by the vector $\vec{B}$.

Step 955: Acquire an angle according to an included angle calculation formula.

Since the current firing curve of the muzzle needs to be represented by a rotation with the root node of the virtual firearm as the center, a rotation angle of the virtual firearm with the root node as the center needs to be calculated.

The angle is acquired according to the first vector and the second vector by the following formula:

$$\theta = \operatorname{atan2}(\sin(\theta), \cos(\theta)) = \operatorname{atan2}((\vec{A}\times\vec{B})*\vec{n}, \vec{A}*\vec{B}) = \operatorname{atan2}((\vec{A}\times\vec{B})\cdot\operatorname{norm}(\ ), \vec{A}*\vec{B})$$

Where atan2 represents an arctangent function; $\vec{n}$ represents a unit vector; * represents a point multiplication of a vector, the result of which is a number; x represents a cross multiplication of a vector, the result of which is a vector; norm ( ) represents a function that assigns a length and a size to a vector.

In summary, the embodiments of this disclosure, taking the first-person shooting game as an example, show the process of determining and displaying the body recoil animation and the muzzle recoil animation, provide a shooting displaying method for the virtual firearm, to make shooting display of the virtual firearm closer to the scene of real shooting, and enhances the real shooting feeling acquired by the user during simulated shooting.

The following describes apparatus embodiments of this disclosure, which can be used for executing the method embodiments of this disclosure. For details not disclosed in the apparatus embodiments of this disclosure, refer to the method embodiments of this disclosure.

Figure 13:
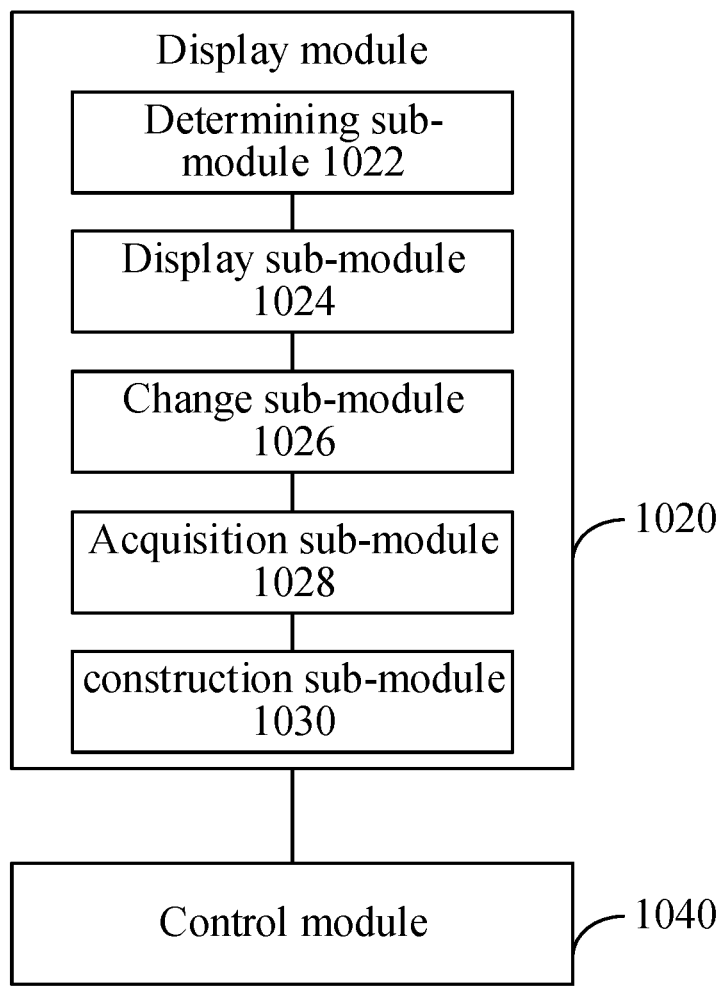
FIG. 13 is a structural block diagram of a shooting display apparatus for a virtual firearm provided by an exemplary embodiment of this disclosure.

FIG. 13 is a structural block diagram of a shooting display apparatus for a virtual firearm provided by an exemplary embodiment of this disclosure. The apparatus includes:

a display module 1020, configured to display the virtual firearm in a virtual scene; and a control module 1040, configured to control the virtual firearm for continuous shooting in the virtual scene;

the display module 1020 is further configured to display, in response to the virtual firearm performing one shot during the continuous shooting, at least one of a body recoil animation and a muzzle recoil animation of the virtual firearm.

The body recoil animation is an animation in which a body of the virtual firearm fluctuates according to a fluctuation curve in at least one direction of an X axis and a Y axis; the muzzle recoil animation is an animation in which a muzzle of the virtual firearm fluctuates according to a fluctuation curve with a root node of the virtual firearm as a center; the X axis is used for indicating a horizontal recoil direction of the virtual firearm; the Y axis is used for indicating a vertical recoil direction of the virtual firearm.

In one possible design, the display module 1020 is configured to display, in response to the virtual firearm performing one shot during the continuous shooting, a body recoil animation in which the body of the virtual firearm fluctuates according to a sinusoid in at least one of an X axis and a Y axis.

In one possible design, the display module includes a determining sub-module 1022 and a display sub-module 1024; the determining sub-module 1022 is configured to determine, according to a shot count corresponding to a current shot in the continuous shooting, a base amplitude of the virtual firearm and a recoil factor of the virtual firearm, where the recoil factor is positively correlated with the shot count; the determining sub-module 1022 is further configured to determine the first sinusoid according to the base amplitude of the virtual firearm and the recoil factor of the virtual firearm; the display sub-module 1024 is configured to display the body recoil animation in which the body of the virtual firearm fluctuates according to the first sinusoid in the X axis direction.

Alternatively or additionally, the determining sub-module 1022 is configured to determine, according to a shot count corresponding to a current shot in the continuous shooting, a base amplitude of the virtual firearm and a recoil factor of the virtual firearm, where the recoil factor is positively correlated with the shot count; the determining sub-module 1022 is further configured to determine the second sinusoid according to the base amplitude of the virtual firearm and the recoil factor of the virtual firearm; the display sub-module 1024 is configured to display the body recoil animation in which the body of the virtual firearm fluctuates according to the second sinusoid in the Y axis direction.

Alternatively or additionally, the determining sub-module 1022 is configured to determine, according to a shot count corresponding to a current shot in the continuous shooting, a base amplitude of the virtual firearm and a recoil factor of the virtual firearm, where the recoil factor is positively correlated with the shot count; the determining sub-module 1022 is further configured to determine the first sinusoid and the second sinusoid respectively according to the base amplitude of the virtual firearm and the recoil factor of the virtual firearm; the display sub-module 1024 is configured to display the body recoil animation in which the body of the virtual firearm fluctuates according to the first sinusoid in the X axis direction and fluctuates according to the second sinusoid in the Y axis direction.

In one possible design, the determining sub-module 1022 is further configured to calculate a first product of the base amplitude of the virtual firearm and the recoil factor; the first product is taken as a maximum fluctuation amplitude of the first sinusoid.

In one possible design, the determining sub-module 1022 is further configured to take the base amplitude of the virtual firearm is as the maximum fluctuation amplitude of the first sinusoid; the recoil factor is taken as an angular velocity of the first sinusoid.

In one possible design, the determining sub-module 1022 is further configured to calculate a second product of the base amplitude of the virtual firearm and the recoil factor; the second product is taken as a maximum fluctuation amplitude of the second sinusoid.

In one possible design, the determining sub-module 1022 is further configured to take the base amplitude of the virtual firearm is as the maximum fluctuation amplitude of the second sinusoid; the recoil factor is taken as an angular velocity of the second sinusoid.

In one possible design, the determining sub-module 1022 is configured to calculate a first product of the base amplitude of the virtual firearm and the recoil factor, and the first product is taken as a maximum fluctuation amplitude of the first sinusoid; and calculate a second product of the base amplitude of the virtual firearm and the recoil factor; the second product is taken as a maximum fluctuation amplitude of the second sinusoid.

In one possible design, the determining sub-module 1022 is configured to take the base amplitude of the virtual firearm is as the maximum fluctuation amplitude of the first sinusoid, and the recoil factor is taken as an angular velocity of the first sinusoid; take the base amplitude of the virtual firearm is as the maximum fluctuation amplitude of the second sinusoid, and the recoil factor is taken as an angular velocity of the second sinusoid.

In one possible design, the display module further includes a change sub-module 1026; the determining sub-module 1022 is configured to determine, during a current shot, a movement direction of the virtual firearm along the X axis; the change sub-module 1026 is configured to change a sign of the first sinusoid when the movement direction of the virtual firearm along the X axis is inconsistent with the fluctuation direction of the first sinusoid.

In one possible design, the display module 1020 is configured to display, in response to the virtual firearm performing one shot during the continuous shooting, the muzzle recoil animation in which the muzzle of virtual firearm fluctuates according to a sinusoid with a root node of the virtual firearm as a center.

In one possible design, the determining sub-module 1022 is configured to determine, according to a shot count corresponding to a current shot in the continuous shooting, a base amplitude of the virtual firearm and a recoil factor of the virtual firearm, where the recoil factor is positively correlated with the shot count; the determining sub-module 1022 is further configured to determine a third sinusoid according to the base amplitude of the virtual firearm and the recoil factor of the virtual firearm; the display sub-module 1024 is configured to display the muzzle recoil animation in which the muzzle of the virtual firearm fluctuates according to the third sinusoid with the root node of the virtual firearm as the center.

In one possible design, the display module also includes an acquisition sub-module 1028 and a construction sub-module 1030; the determining sub-module 1022 is configured to determine, according to the muzzle recoil animation, a first muzzle position and a second muzzle position of the virtual firearm, where the first muzzle position is the position where the muzzle of the virtual firearm is located at the current moment, and the second muzzle position is the position where the muzzle of the virtual firearm is located at the next moment; the acquisition sub-module 1028 is configured to acquire a body position of the virtual firearm is obtained; the construction sub-module 1030 is configured to construct a first vector of the body position pointing to the first muzzle position and a second vector of the body position pointing to the second muzzle position; the determining sub-module 1022 is configured to determine an included angle between the first vector and the second vector as a rotation amount of the muzzle of the virtual firearm relative to the body of the virtual firearm.

In one possible design, the display module 1020 is configured to display a basic animation of the virtual firearm performing the continuous shooting when a shot count of the continuous shooting is less than or equal to a count threshold, where the basic animation is an animation of the body of the virtual firearm moving back and forth during the continuous shooting; the display module 1020 is further configured to superimpose at least one of the body recoil animation and the muzzle recoil animation on the basis of the basic animation of the virtual firearm performing the continuous shooting when the shot count of the continuous shooting exceeds the count threshold, and display a superimposed animation.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 14:
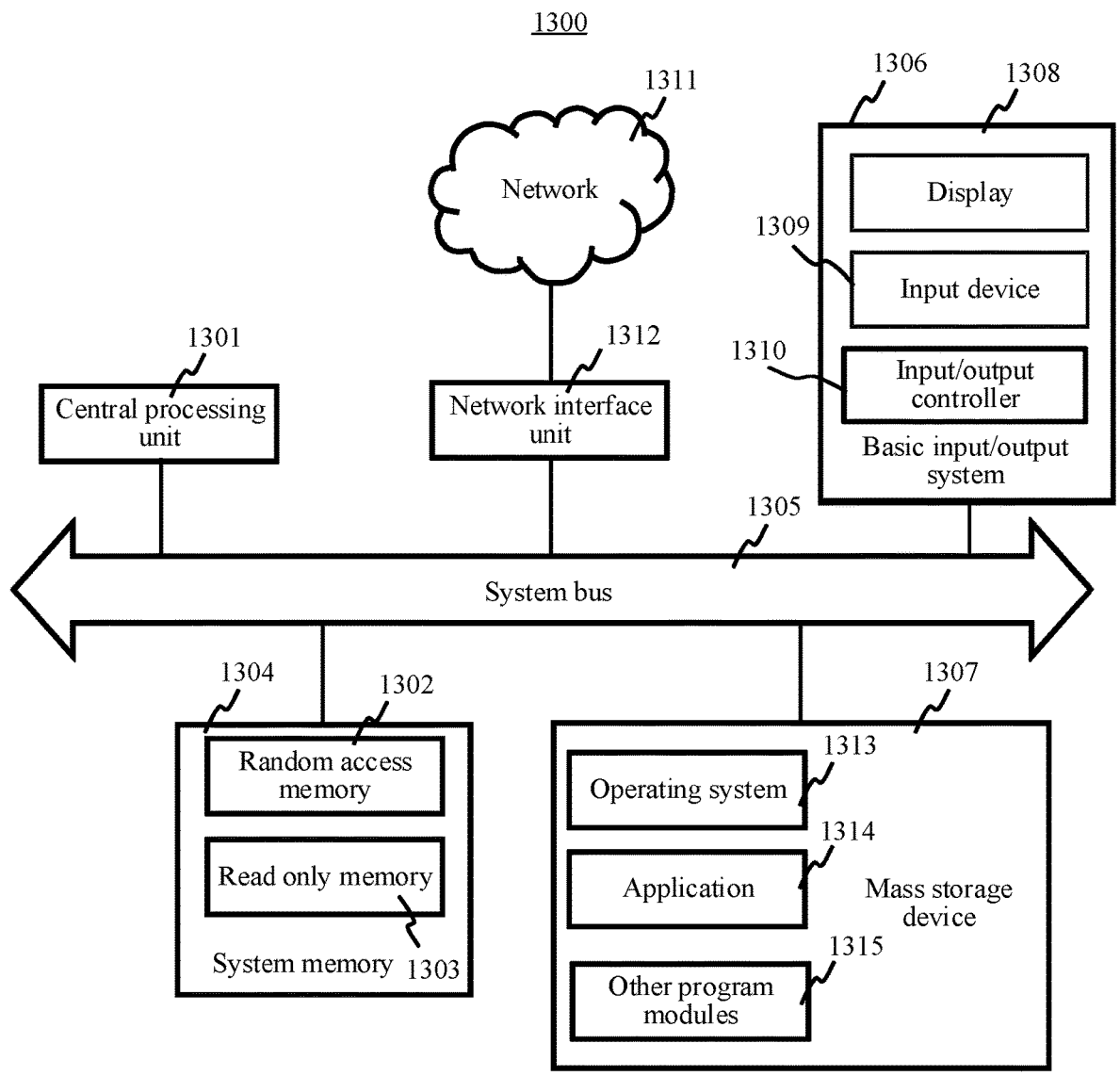
FIG. 14 is a block diagram of a computer device provided by an exemplary embodiment of this disclosure.

FIG. 14 is a schematic structural diagram of a terminal according to an exemplary embodiment. The terminal 1300 includes a central processing unit (CPU) 1301, a system memory 1304 including a random access memory (RAM) 1302 and a read-only memory (ROM) 1303, and a system bus 1305 connecting the system memory 1304 and the central processing unit 1301. The computer device 1300 further includes a basic input/output system (I/O system) 1306 to facilitate the transfer of information between elements within the computer device, and a mass storage device 1307 configured to store an operating system 1313, applications 1314, and other program modules 1315.

The basic input/output system 1306 includes a display 1308 configured to display information and an input device 1309 such as a mouse and a keyboard for a user to input information. The display 1308 and the input device 1309 are both connected to the central processing unit 1301 through an input/output controller 1310 connected to the system bus 1305. The basic input/output system 1306 may further include the input/output controller 1310 for receiving and processing input from a plurality of other devices such as a keyboard, a mouse, an electronic stylus, or the like. Similarly, the input/output controller 1310 also provides an output to a display screen, printer, or other types of output devices.

The mass storage device 1307 is connected to the central processing unit 1301 through a mass storage controller (not shown) connected to the system bus 1305. The mass storage device 1307 and its associated computer device-readable media provide non-volatile storage for the computer device 1300. That is, the mass storage device 1307 may include a computer device-readable medium (not shown) such as a hard disk or a compact disc read-only memory (CD-ROM) drive.

Without loss of generality, the computer device-readable media may include computer device storage media and communication media. Computer device storage media includes volatile and nonvolatile, removable and non-removable media implemented in any method or technology for storage of information such as computer device-readable instructions, data structures, program modules or other data. Computer device storage media include the RAM, the ROM, an erasable programmable read only memory (EPROM), an electrically erasable programmable read-only memory (EEPROM), a CD-ROM, a digital video disc (DVD) or other optical storages, a magnetic cassette, a magnetic tape, a magnetic disk storage or other magnetic storage devices. Of course, those skilled in the art will recognize that the computer device storage medium is not limited to the above. The above-mentioned system memory 1304 and mass storage device 1307 may be collectively referred to as a memory.

According to various embodiments of the present disclosure, the computer device 1300 may also operate as a remote computer device connected to a network via a network such as the Internet. That is, the computer device 1300 may be connected to the network 1311 through a network interface unit 1312 connected to the system bus 1305; or the network interface unit 1312 may also be used to connect to other types of networks or remote computer device systems (not shown).

The memory further includes one or more programs stored therein; the central processing unit 1301 executes the one or more programs to implement all or part of the steps of the above-mentioned shooting display method for the virtual firearm.

In an exemplary embodiment, there is further provided a computer-readable storage medium having stored therein at least one instruction, at least one piece of a program, a set of codes, or a set of instructions that are loaded and executed by a processor to implement the shooting display method for the virtual firearm provided by the shooting display method for the virtual firearm provided by above-mentioned various embodiments.

In an exemplary embodiment, there is further provided a computer program product or a computer program including computer instructions stored in a computer-readable storage medium. The processor of the computer device reads the computer instructions from the computer-readable storage medium, and executes the computer instructions to cause the computer device to perform the above-described shooting display method for the virtual firearm in the above-mentioned aspects.

What is claimed is:
1. A displaying method, the method comprising:
displaying a virtual firearm in a virtual scene;
controlling the virtual firearm for continuous shooting in the virtual scene; and displaying, in response to the virtual firearm performing one shot during the continuous shooting, at least one of a body recoil animation and a muzzle recoil animation of the virtual firearm, the body recoil animation being an animation in which a body of the virtual firearm fluctuates according to a fluctuation curve in at least one direction of an X axis and a Y axis, the muzzle recoil animation being an animation in which a muzzle of the virtual firearm fluctuates according to the fluctuation curve with a root node of the virtual firearm as a center, the X axis being a horizontal recoil direction of the virtual firearm, and the Y axis being a vertical recoil direction of the virtual firearm.

2. The method according to claim 1, comprising displaying the body recoil animation of the virtual firearm by:

displaying, in response to the virtual firearm performing one shot during the continuous shooting, the body recoil animation in which the body of the virtual firearm fluctuates according to a sinusoid in at least one direction of the X axis and the Y axis.

3. The method according to claim 2, wherein displaying, in response to the virtual firearm performing one shot during the continuous shooting, the body recoil animation in which the body of the virtual firearm fluctuates according to the sinusoid in at least one direction of the X axis and the Y axis comprises:

determining, according to a shot count corresponding to a current shot in the continuous shooting, a base amplitude of the virtual firearm and a recoil factor of the virtual firearm, the recoil factor being positively correlated with the shot count;

determining a first sinusoid according to the base amplitude of the virtual firearm and the recoil factor of the virtual firearm; and displaying the body recoil animation in which the body of the virtual firearm fluctuates according to the first sinusoid in the X axis direction.

4. The method according to claim 3, further comprising:

determining, during a current shot, a movement direction of the virtual firearm along the X axis; and changing a sign of the first sinusoid when the movement direction of the virtual firearm along the X axis is inconsistent with a fluctuation direction of the first sinusoid.

5. The method according to claim 3, wherein determining the first sinusoid according to the base amplitude of the virtual firearm and the recoil factor of the virtual firearm comprises:

calculating a first product of the base amplitude of the virtual firearm and the recoil factor, the first product being taken as a maximum fluctuation amplitude of the first sinusoid; or taking the base amplitude of the virtual firearm as a maximum fluctuation amplitude of the first sinusoid and the recoil factor as an angular velocity of the first sinusoid.

6. The method according to claim 2, comprising displaying the body recoil by:

determining, according to a shot count corresponding to a current shot in the continuous shooting, a base amplitude of the virtual firearm and a recoil factor of the virtual firearm, the recoil factor being positively correlated with the shot count;

determining a second sinusoid according to the base amplitude of the virtual firearm and the recoil factor of the virtual firearm; and displaying the body recoil animation in which the body of the virtual firearm fluctuates according to the second sinusoid in the Y axis direction.

7. The method according to claim 6, wherein determining the second sinusoid according to the base amplitude of the virtual firearm and the recoil factor of the virtual firearm comprises:

calculating a second product of the base amplitude of the virtual firearm and the recoil factor, the second product being taken as a maximum fluctuation amplitude of the second sinusoid; or taking the base amplitude of the virtual firearm as a maximum fluctuation amplitude of the second sinusoid and the recoil factor as an angular velocity of the second sinusoid.

8. The method according to claim 2, comprising displaying the body recoil animation by:

determining, according to a shot count corresponding to a current shot in the continuous shooting, a base amplitude of the virtual firearm and a recoil factor of the virtual firearm, the recoil factor being positively correlated with the shot count;

determining a first sinusoid and a second sinusoid according to the base amplitude of the virtual firearm and the recoil factor of the virtual firearm; and displaying the body recoil animation in which the body of the virtual firearm fluctuates according to the first sinusoid in the X axis direction and fluctuates according to the second sinusoid in the Y axis direction.

9. The method according to claim 8, wherein determining the first sinusoid and the second sinusoid according to the base amplitude of the virtual firearm and the recoil factor of the virtual firearm comprises:

calculating a first product of the base amplitude of the virtual firearm and the recoil factor, and taking the first product as a maximum fluctuation amplitude of the first sinusoid; and calculating a second product of the base amplitude of the virtual firearm and the recoil factor, and taking the second product as a maximum fluctuation amplitude of the second sinusoid.

10. The method according to claim 8, wherein determining the first sinusoid and the second sinusoid according to the base amplitude of the virtual firearm and the recoil factor of the virtual firearm comprises:

taking the base amplitude of the virtual firearm as a maximum fluctuation amplitude of the first sinusoid, and taking the recoil factor as an angular velocity of the first sinusoid; and taking the base amplitude of the virtual firearm as a maximum fluctuation amplitude of the second sinusoid, and taking the recoil factor as an angular velocity of the second sinusoid.

11. The method according to claim 1, comprising displaying the muzzle recoil animation of the virtual firearm comprises by:

displaying, in response to the virtual firearm performing one shot during the continuous shooting, the muzzle recoil animation in which the muzzle of the virtual firearm fluctuates according to a sinusoid with a root node of the virtual firearm as a center.

12. The method according to claim 11, wherein the displaying, in response to the virtual firearm performing one shot during the continuous shooting, the muzzle recoil animation in which the muzzle of the virtual firearm fluctuates according to a sinusoid with a root node of the virtual firearm as a center comprises:
- determining, according to a shot count corresponding to a current shot in the continuous shooting, a base amplitude of the virtual firearm and a recoil factor of the virtual firearm, the recoil factor being positively correlated with a shot count;
- determining a third sinusoid according to the base amplitude of the virtual firearm and the recoil factor of the virtual firearm; and
- displaying the muzzle recoil animation in which the muzzle of the virtual firearm fluctuates according to the third sinusoid with the root node of the virtual firearm as the center.

13. The method according to claim 12, wherein determining the third sinusoid according to the base amplitude of the virtual firearm and the recoil factor of the virtual firearm comprises:
- calculating a third product of the base amplitude of the virtual firearm and the recoil factor, and taking the third product as a maximum fluctuation amplitude of the third sinusoid;
or
- taking the base amplitude of the virtual firearm as a maximum fluctuation amplitude of the third sinusoid, and taking the recoil factor as an angular velocity of the third sinusoid.

14. The method according to claim 12, further comprising:
- determining a first muzzle position and a second muzzle position of the virtual firearm according to the muzzle recoil animation, the first muzzle position being a position where the muzzle of the virtual firearm being located at a current moment, and the second muzzle position being a position where the muzzle of the virtual firearm is located at a next moment; and acquiring a body position of the virtual firearm;
- constructing a first vector of the body position pointing to the first muzzle position and a second vector of the body position pointing to the second muzzle position; and
- determining an included angle between the first vector and the second vector as a rotation amount of the muzzle of the virtual firearm relative to the body of the virtual firearm.

15. The method according to claim 1, wherein displaying, in response to the virtual firearm performing one shot during the continuous shooting, at least one of the body recoil animation and the muzzle recoil animation of the virtual firearm comprises:
- displaying a basic animation of the virtual firearm performing the continuous shooting when a shot count of the continuous shooting is less than or equal to a count threshold, the basic animation being an animation of the body of the virtual firearm moving back and forth during the continuous shooting; and
- superimposing at least one of the body recoil animation and the muzzle recoil animation on the basis of the basic animation of the virtual firearm performing the continuous shooting when the shot count of the continuous shooting exceeds the count threshold, and displaying a superimposed animation.

16. A non-transitory computer-readable storage medium having stored therein program instructions, configured to, when executed by a processor, cause an apparatus to perform steps comprising:
- displaying a virtual firearm in a virtual scene;
- controlling the virtual firearm for continuous shooting in the virtual scene; and
- displaying, in response to the virtual firearm performing one shot during the continuous shooting, at least one of a body recoil animation and a muzzle recoil animation of the virtual firearm, the body recoil animation being an animation in which a body of the virtual firearm fluctuates according to a fluctuation curve in at least one direction of an X axis and a Y axis,
- the muzzle recoil animation being an animation in which a muzzle of the virtual firearm fluctuates according to the fluctuation curve with a root node of the virtual firearm as a center,
- the X axis being a horizontal recoil direction of the virtual firearm, and
- the Y axis being a vertical recoil direction of the virtual firearm.

17. The non-transitory computer-readable storage medium of claim 16, wherein the program instructions are configured to, when executed by the processor, cause the apparatus to display the body recoil animation of the virtual firearm by:
- displaying, in response to the virtual firearm performing one shot during the continuous shooting, the body recoil animation in which the body of the virtual firearm fluctuates according to a sinusoid in at least one direction of the X axis and the Y axis.

18. The non-transitory computer-readable storage medium of claim 17, wherein the program instructions are configured to, when executed by the processor, cause the apparatus to display, in response to the virtual firearm performing one shot during the continuous shooting, the body recoil animation in which the body of the virtual firearm fluctuates according to the sinusoid in at least one direction of the X axis and the Y axis by:
- determining, according to a shot count corresponding to a current shot in the continuous shooting, a base amplitude of the virtual firearm and a recoil factor of the virtual firearm, the recoil factor being positively correlated with the shot count;
- determining a first sinusoid according to the base amplitude of the virtual firearm and the recoil factor of the virtual firearm; and
- displaying the body recoil animation in which the body of the virtual firearm fluctuates according to the first sinusoid in the X axis direction.

19. The non-transitory computer-readable storage medium of claim 18, wherein the program instructions are further configured to, when executed by the processor, cause the apparatus to perform steps comprising:
- determining, during a current shot, a movement direction of the virtual firearm along the X axis; and
- changing a sign of the first sinusoid when the movement direction of the virtual firearm along the X axis is inconsistent with a fluctuation direction of the first sinusoid.

20. The non-transitory computer-readable storage medium of claim 18, wherein the program instructions are configured to, when executed by the processor, cause the apparatus to determine the first sinusoid according to the base amplitude of the virtual firearm and the recoil factor of the virtual firearm by:

calculating a first product of the base amplitude of the virtual firearm and the recoil factor, the first product being taken as a maximum fluctuation amplitude of the first sinusoid; or taking the base amplitude of the virtual firearm as a maximum fluctuation amplitude of the first sinusoid and the recoil factor as an angular velocity of the first sinusoid.

* * * * *